(12) United States Patent
Shipes et al.

(10) Patent No.: US 12,347,031 B2
(45) Date of Patent: Jul. 1, 2025

(54) SYSTEMS AND METHODS FOR VARIABLE MULTI-CHANNEL AND MULTI-DIMENSIONAL DATA GENERATION AND TRANSMISSION

(71) Applicant: VAISALA OYJ, Vantaa (FI)

(72) Inventors: Nicholas Craig Shipes, Seattle, WA (US); Seth Jacob Miller, Prior Lake, MN (US); Tony Lee Huffman, Minneapolis, MN (US); David James Hubbard, Chaska, MN (US)

(73) Assignee: VAISALA OYJ, Vantaa (FI)

( * ) Notice: Subject to any disclaimer, the term of this patent is extended or adjusted under 35 U.S.C. 154(b) by 0 days.

(21) Appl. No.: 17/869,454

(22) Filed: Jul. 20, 2022

(65) Prior Publication Data

US 2023/0024459 A1    Jan. 26, 2023

Related U.S. Application Data

(60) Provisional application No. 63/224,928, filed on Jul. 23, 2021.

(51) Int. Cl.
*G06T 17/05*    (2011.01)
*G06F 16/29*    (2019.01)
*G06T 7/187*    (2017.01)

(52) U.S. Cl.
CPC ............. *G06T 17/05* (2013.01); *G06F 16/29* (2019.01); *G06T 7/187* (2017.01); *G06T 2207/30192* (2013.01)

(58) Field of Classification Search
CPC ................. G06T 7/187; G06T 17/05; G06T 2207/30192; G06F 16/29
See application file for complete search history.

(56) References Cited

U.S. PATENT DOCUMENTS 6,985,929 B1 *   1/2006   Wilson ................ G06F 16/29
                                                                 709/219
9,817,563 B1 *  11/2017   Stokes ................ G06F 40/18
(Continued)

OTHER PUBLICATIONS

Li et al. PolarGlobe: A web-wide virtual globe system for visualizing multidimensional, time-varying, big climate data. Int. J. Geogr. Inf. Sci. 31, 8 (Aug. 2017), 1562-1582. (Year: 2017).*

(Continued)

*Primary Examiner* — Daniel F Hajnik
*Assistant Examiner* — Jed-Justin Imperial
(74) *Attorney, Agent, or Firm* — Jonas R Mellang; KELLY, HOLT & CHRISTENSON, P.L.L.C.

(57) ABSTRACT

In one example, a method of generating and delivering environmental data includes receiving a request for requested data corresponding to a first environmental characteristic and a second environmental characteristic. The method includes retrieving a first set of data corresponding to the first environmental characteristic. The method includes retrieving a second set of data corresponding to the second environmental characteristic. The method includes generating an image having a first channel and a second channel. The values of the first channel correspond to the first set of data. The values of the second channel correspond to the second set of data.

10 Claims, 36 Drawing Sheets

(56) References Cited

U.S. PATENT DOCUMENTS

| | | | |
|---|---|---|---|
| 2014/0240468 A1* | 8/2014 | Feke | A61B 1/0646 |
| | | | 348/47 |
| 2016/0133046 A1* | 5/2016 | Tokumoto | G06T 15/503 |
| | | | 345/592 |
| 2017/0228899 A1* | 8/2017 | Witriol | G06T 11/001 |
| 2017/0358130 A1* | 12/2017 | Griffith | G06T 17/05 |

OTHER PUBLICATIONS

"Slippy map tilenames", retrieved at <<https://wiki.openstreetmap.org/wiki/Slippy_map_tilenames>>, retrieved on Jul. 19, 2022, 35 pages.

"How do you pack one 32bit int Into 4, 8bit ints in glsl / webgl?", retrieved at <<https://stackoverflow.com/questions/18453302/how-do-you-pack-one-32bit-int-into-4-8bit-ints-in-glsl-webgl/45759332#45759332>>, retrieved on Jul. 19, 2022, 3 pages.

"WebGL shader function to decode a 32-bit float from the RGBA color channels of a texel", Retrieved at <<https://github.com/ihmeuw/glsl-rgba-to-float>>, retrieved on Jul. 19, 2022, 3 pages.

Li, W. and Wang, S., 2017. PolarGlobe: A web-wide virtual globe system for visualizing multidimensional, time-varying, big climate data. International Journal of Geographical Information Science, 31(8), 22 pages.

Agafonkin, Vladimir: "How I built a wind map with WebGL", Jul. 27, 2017, Retrieved from the Internet: URL:https://blog.mapbox.com/how-i-built-a-wind-map-with-webgl-b63022b5537f [retrieved on Nov. 18, 2022], 14 pages.

Yang, Y., Sharma, A. and Girier, A., Jun. 2015. Volumetric texture data compression scheme for transmission. In Proceedings of the 20th International Conference on 3D Web Technology, 4 pages.

Ma, T.H., Tian, W., Wang, B., Guan, D.H. and Lee, S.Y., 2011. Weather data sharing system: an agent-based distributed data management. IET software, 5(1), 12 pages.

Kim, J.S., Polys, N. and Sforza, P., Jun. 2015. Preparing and evaluating geospatial data models using X3D encodings for web 3D geovisualization services. In Proceedings of the 20th International Conference on 3D Web Technology, 9 pages.

Database Inspec [Online], The Institution of Electrical Engineers, Stevenage, GB, Apr. 2014, Wang Y Q: MeteoInfo: GIS software for meteorological data visualization and analysis, 2 page.

International Search Report and Written Opinion for International Patent Application No. PCT/IB2022/000423, mailing date of: Jan. 2, 2023, 17 pages.

International Preliminary Report on Patentability for PCT Application No. PCT/IB2022/000423, dated Jan. 18, 2024, 10 pages.

Australian Office Action for Application No. 2022315597, dated Aug. 23, 2024, 3 pages.

CA3,225,262 First Office action, mailed on Mar. 3, 2025, 7 pages.

* cited by examiner

```
1100

1102  X-AW-WIDTH=200 # Image is 200px wide (actual image will
      be larger due
      to packing of time series data, as described below)
      X-AW-HEIGHT=100
1104  X-AW-DATASET-TEMPERATURES=R # Temperatures is on the
      red band of our
      PNG image
1106  X-AW-DATASET-TEMPERATURES-MIN=-30
      X-AW-DATASET-TEMPERATURES-MAX=80
1108  X-AW-DATASET-TEMPERATURES-STEP=0.5
1110  X-AW-DATASET-TEMPERATURES-UNITS=C
1104  X-AW-DATASET-WIND-U=G
1106  X-AW-DATASET-WIND-U-MIN=-25
      X-AW-DATASET-WIND-U-MAX=25
1108  X-AW-DATASET-WIND-U-STEP=1 # The server determined this
      value because
      it wasn't specified
1110  X-AW-DATASET-WIND-U-UNITS=m/s
1104  X-AW-DATASET-WIND-V=B
1106  X-AW-DATASET-WIND-V-MIN=-25
      X-AW-DATASET-WIND-V-MAX=25
1108  X-AW-DATASET-WIND-V-STEP=1 # The server determined this
      value because
      it wasn't specified
1110  X-AW-DATASET-WIND-V-UNITS=m/s
1120  X-AW-TIMING=columns # Our time series data is layed out
      in each column
      (making the actual image a multiple of our requested
      size)
1122  X-AW-TIMING-MIN=2021-06-08T01:00:00Z # Timestamp of the
      starting frame
      of our animation
      X-AW-TIMING-MAX=2021-06-08T07:00:00Z # "current" as
      requested was
      resolved to this nearest time on the server
1124  X-AW-TIMING-STEP=PT1H # The ISO-8601 standard format
      for time interval,
      1 hour in this case.
1126  X-AW-TIMING-COUNT=6 # Expect 6 frames for the animation
      ...
1130
```

FIG. 11

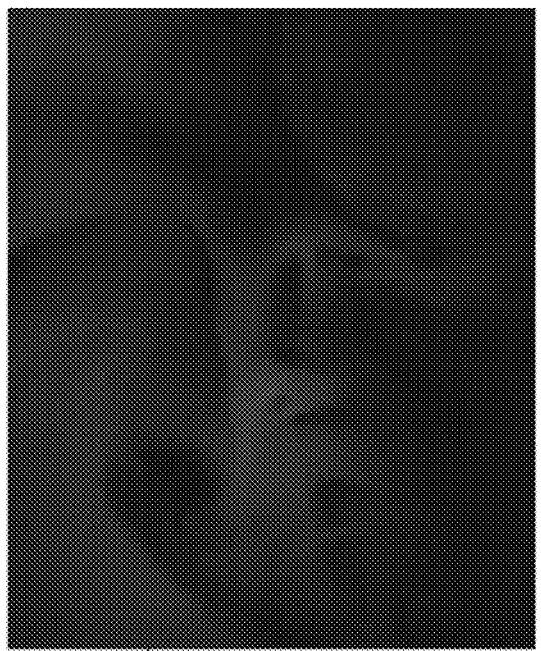
FIG. 17

SYSTEMS AND METHODS FOR VARIABLE MULTI-CHANNEL AND MULTI-DIMENSIONAL DATA GENERATION AND TRANSMISSION

CROSS-REFERENCE TO RELATED APPLICATION

The present application is based on and claims the benefit of U.S. Provisional Patent Application Ser. No. 63/224,928, filed Jul. 23, 2021, the content of which is hereby incorporated by reference in its entirety.

BACKGROUND

There are a wide variety of different types of mapping platforms. These platforms often operate by collecting and displaying different types of data in a readable way for a user. Some such platforms include geographical mapping, level/altitude mapping, environmental mapping, and weather mapping. These platforms are useful for providing information to an end-user pertaining to geographic and environmental conditions at a particular time. For example, a user may be interested in seeing which direction the wind is coming from. In another example, perhaps a user is interested in the temperature around their location.

However, many such platforms are typically unfriendly in relation to user accessibility, and often only portray a complicated list of data points for different locations rather than producing a clear image of geographical and environmental conditions in a surrounding area. Additionally, mapping platforms that are capable of displaying different types of data are limited in dimensionality and inefficient due to the large amount of data being sent to the user.

The discussion above is merely provided for general background information and is not intended to be used as an aid in determining the scope of the claimed subject matter.

SUMMARY

In one example, a method of generating and delivering environmental data includes receiving a request for requested data corresponding to a first environmental characteristic and a second environmental characteristic. The method includes retrieving a first set of data corresponding to the first environmental characteristic. The method includes retrieving a second set of data corresponding to the second environmental characteristic. The method includes generating an image having a first channel and a second channel. The values of the first channel correspond to the first set of data. The values of the second channel correspond to the second set of data.

BRIEF DESCRIPTION OF THE DRAWINGS

FIG. 11 is a diagram showing an example response header.
FIG. 17 is a diagram showing different example renderings of a data image with different settings.

DETAILED DESCRIPTION OF ILLUSTRATIVE EMBODIMENTS

As set forth above, current mapping platforms are limited in dimensionality and efficiency. For example, many such mapping platforms involve sending large amounts of data to the end-user, which can be problematic based on the bandwidth of the network. Accordingly, a mapping platform capable of effectively displaying data for a user in a manner that increases dimensional capabilities while maximizing machine efficiency is desired. As further detailed below, the systems and methods described herein address at least some of these issues.

While the images set forth in FIGS. 1-36 are depicted in grayscale, it is expressly contemplated that the shading depicted in the images can correspond to color, and color can be utilized in any one or more of the data images or interfaces, as described in detail below. For example, an image can include white for snow, blue for light rain, purple for heavy rain, etc. In another example, shown below, sub images can be shown in "true color," meaning that image is displayed using the RGB values corresponding to red-blue and green pixel values for illustrative purposes. Additionally, it is expressly contemplated that color can be utilized in other ways as well, as further described below with respect to FIGS. 1-36.

Figure 1:
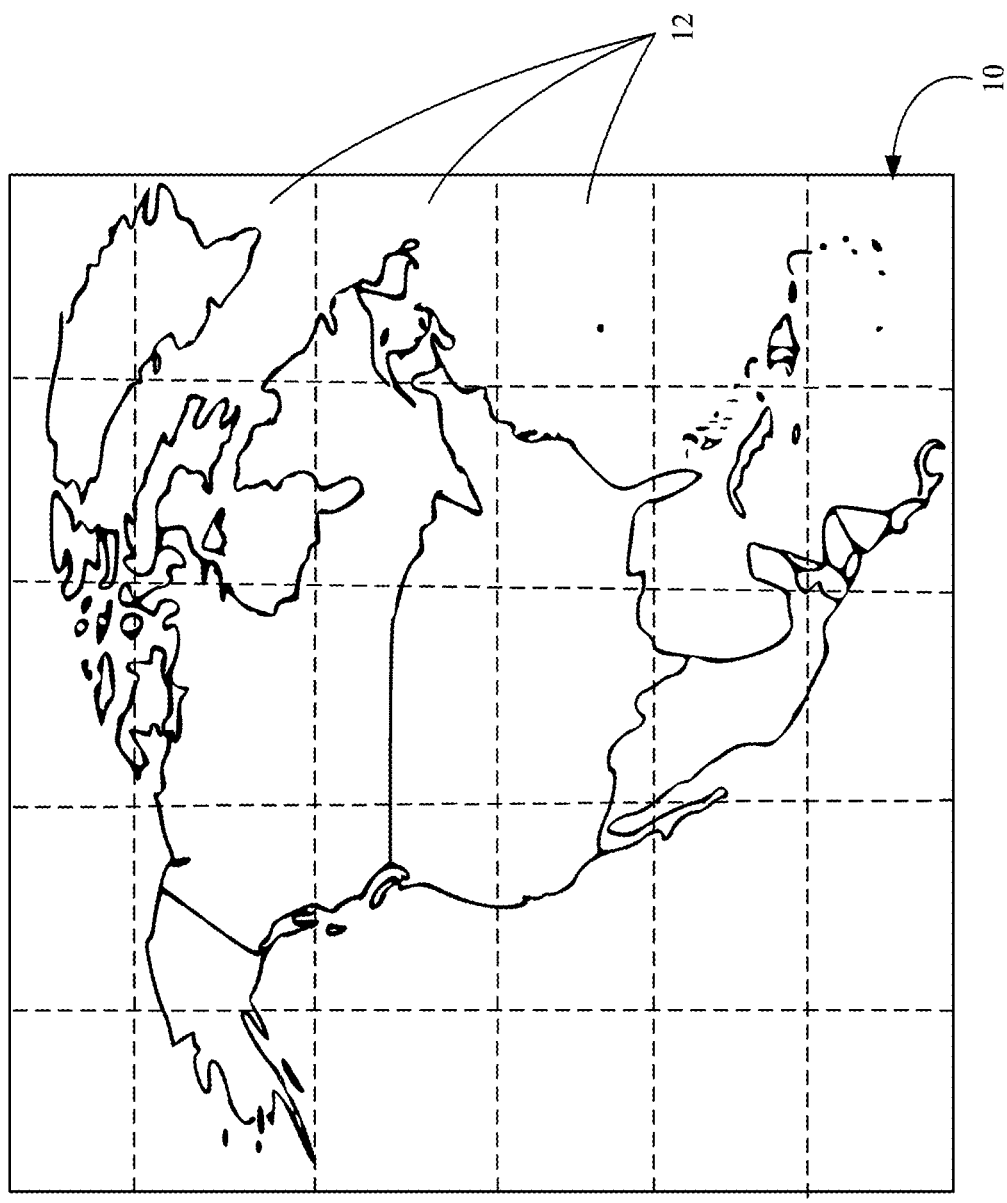
FIG. 1 is a diagram showing an example user interface.

FIG. 1 is a diagram showing an example interface 10. Interface 10 displays environment data corresponding to geographic locations to a user. For example, the user can request precipitation data for a given geographic location, and interface 10 will display precipitation data for the shown geographic regions in the form of a weather radar-like map.

Interface 10, as shown, includes a plurality of tiles 12 that segment the data across the larger area of interface 10. Additionally, tiles 12 can include the data for sub areas defined by a respective tile. The resolution of tiles 12 can be determined based on the geographic granularity of the data available or data requested.

In one example, tiles 12 are pre-generated images from a server. These images are generated based on a display scheme to illustrate a variety of weather characteristics. For example, an image for precipitation can include white for snow, blue for light rain, and purple for heavy rain, while areas without precipitation could be transparent or include a rendering of the geographic area to simulate transparency. In operation, a user device receives these pre-generated images (corresponding to tiles 12) and displays them as generated with minimal, if any, processing. If a user requests a different set of data, then a different set of tiles 12 are generated by the server and delivered to the user device for display. For example, colored-coded high pressure and low-pressure images are generated at the server and sent to the user device. A disadvantage to this approach is that the server generates images for each characteristic, and the user device that displays the image generated by the server is limited for zooming by the resolution of the image. This consequently increases the amount of data sent to the user, which can be problematic based on the bandwidth of the network.

In one example described herein, tiles 12 include images that represent more than one characteristic or a characteristic in more than one dimension. For instance, the image can utilize the Red-Green-Blue-Alpha (RGBA) channels to store data indicative of four different characteristics. In other examples, the RGBA channels store values indicative of temperature values at several (e.g., four) different times, temperatures at different elevations, etc.

As shown, interface 10 represents a geographic region (illustratively North America). In another example, the data can correspond to other places, such as a building with its own grid of tiles 12 to define rooms and floors. In another example, the data can correspond to regions of a planet other than earth.

Figure 2:
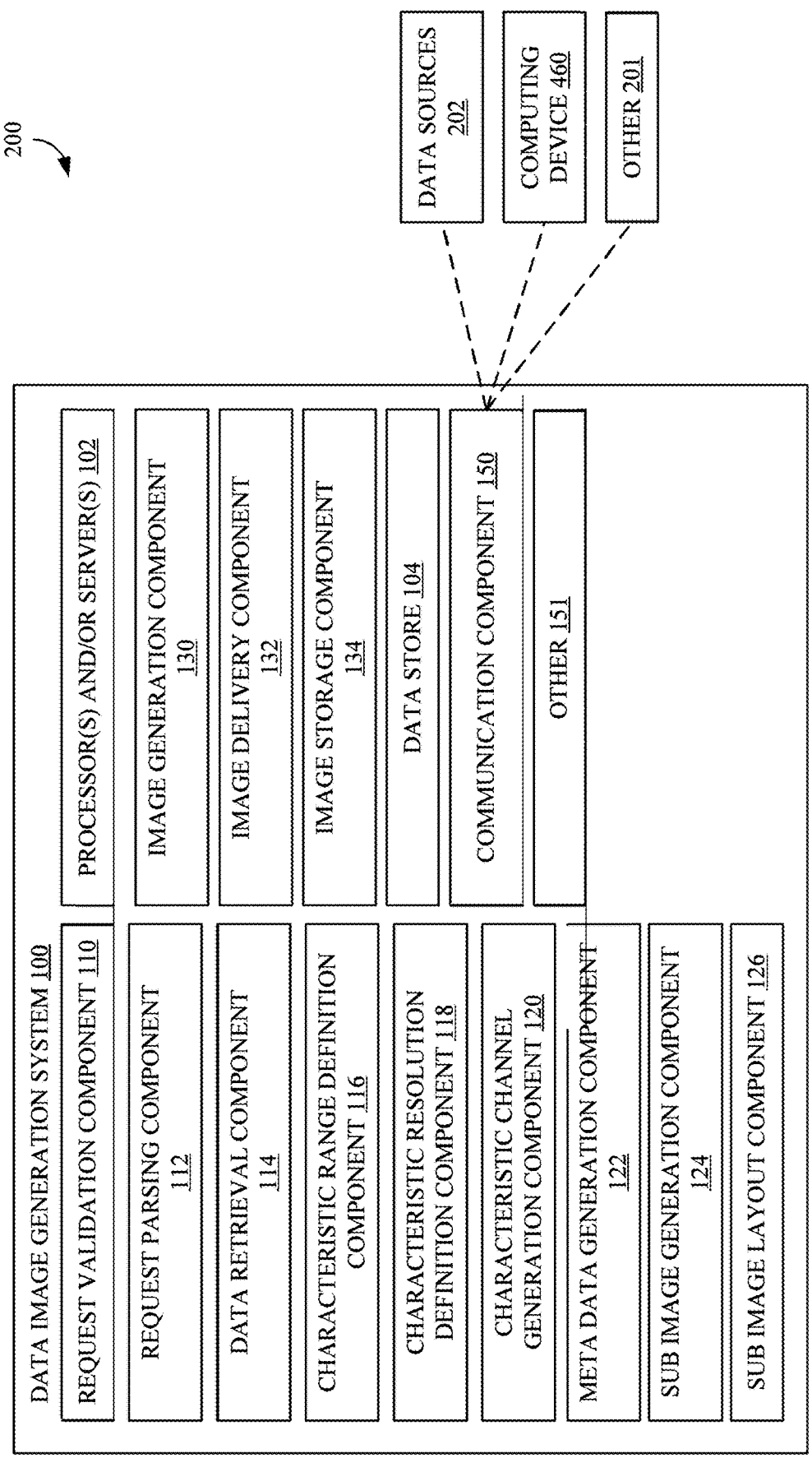
FIG. 2 is a block diagram showing an example computing environment.

FIG. 2 is a block diagram showing an example computing environment 200. Computing environment 200 includes data image generation system 100, data sources 202, computing device 460, and can include other items as well, as indicated by block 201. Broadly, data image generation system 100 generates a data image indicative of more than one characteristic based on a request from the computing device 460. Data image generation system 100 generates the data image and delivers the image to the requesting computing device 460. In some examples, data image generation system 100 accesses data sources 202 to retrieve the data that is to be incorporated in the data image. Some examples of data sources 202 include government agencies, commercial entities, user mobile devices, and other data sources 202. For example, U.S. Pat. No. 10,437,814 describes examples of various data sources 202. The contents of U.S. Pat. No. 10,437,814 are herein incorporated by reference, in its entirety.

Data image generation system 100 includes processors and/or servers 102, a datastore 104, a request validation component 110, a request parsing component 112, a data retrieval component 114, a characteristic range definition component 116, a characteristic resolution definition component 118, a characteristic channel generation component 120, a metadata generation component 122, a sub image generation component 124, a sub image layout component 126, an image generation component 130, an image delivery component 132, an image storage component 134, a communication component 150 and can include other items as well, as indicated by block 151.

Data image generation system 100 communicates with other components in environment 200 through communication component 150. Communication component 150 can communicate with computing device 460, data sources 202, and other components 201 using a variety of different protocols on a variety of different networks including wide area network, a local area network, Bluetooth, Wi-Fi, near field location, etc. Data image generation system 100 also receives the request for data from computing device 460 through communication component 150. Specifically, request validation component 110 receives the request for data and validates the request. Request validation can include a variety of different factors, including syntax and format checking, user authentication, payment of processing fees, etc.

Request parsing component 112 receives the validated request from request validation component 110 and parses the request for information. The information can include, for example, the requested characteristics, requested time, requested location, requested resolution, and/or requested data source, such as that described below with respect to FIG. 10. Additionally, it is expressly contemplated that different types of information can be acquired as well. Data retrieval component 114 retrieves the data that request parsing component 112 parsed from the request. Data retrieval component 114 can utilize communication component 150 to receive the data from the various data sources 202.

Characteristic range definition component 116 is configured to define the range of the characteristics in the retrieved data. For example, the request of data may include temperature for a particular region (e.g., the Midwest). In this case, the characteristic range would include the minimum and maximum values in the particular geographic region. In other examples, characteristic range definition component 116 can retrieve the characteristic range from the request. For example, the computing device 460 may have requested temperature values above eighty degrees Fahrenheit (F) in the continental United States. In this case, characteristic range definition component 116 can either utilize eighty degrees F. as a minimum or determine a different minimum if applicable (e.g., the minimum temperature is above eighty degrees F.).

Characteristic resolution definition component 118 is configured to determine a resolution of the characteristics and the retrieved data. For example, the requested data could include temperature for a given area. When the raw characteristic values are floating point numbers, the resolution of the raw data may exceed the depth of the channel in the image (e.g., 256 for a single channel of a 4 channel, 8 bit-depth image) and the resolution may need to be scaled and/or rounded such that the values fit within the channel depth. Characteristic resolution definition component 118 can scale the range of values from characteristic range definition component 116 to match the granularity limitations of the channel depth (e.g., such that each unit in the channel is equal to a step of values in the characteristic).

Alternatively, when the resolution of the data exceeds a channel depth, characteristic resolution definition component 118 can use multiple channels to indicate a value. For example, if temperature ranges from negative thirty to eighty degrees Fahrenheit and the resolution requested is ~0.1 degrees per value, all four 8-bit channels could be utilized. For instance, the red channel values could represent temperature values roughly from −20 to −2.5, the green channel could represent values roughly from −25 to 24.9, the blue channel could represent values from 24.9 to 52.5 and the alpha channel could represent values roughly from 52.5 to 80. Or, in another example, if the temperature ranges from negative thirty to eighty degrees Fahrenheit, and the resolution requested is ~0.2 degrees per value, two 8-bit channels could be utilized. In this instance, a first channel could represent values roughly from −20 to 25 degrees and a second channel could represent values roughly from 25 to 80 degrees.

In another example, rather than scaling float values, the float values can be encoded into the channels. For instance, characteristic resolution definition component 118 can encode 32-bit floats into the four 8-bit RGBA channels. The raw float value can be decoded from the image client side, such as using WebGL, and that raw value can be used in a similar manner to the RGBA scaling described above.

Characteristic channel generation component 120 generates the channels utilizing the characteristic range definition component 116 and characteristic resolution definition component 118 output(s). For example, if a computing device 460 requests the weather for North and Central America, the temperature values can range from negative twenty-two degrees F. to one-hundred and six degrees F. In this example, each unit (e.g., 0-255 possible units in a 8-bit depth channel) in the channel is indicative of a step of 0.5° F. Characteristic channel generation component 120 generates each channel that corresponds to the characteristic that computing device 460 requests. In some examples, more than one channel can correspond to the same characteristic. Additionally, in some examples, more than one characteristic can correspond to the same channel.

Metadata generation component 122 generates metadata corresponding to the data image. The metadata can include, for example, the image characteristic data format in the image, such as identifiers of the characteristics, the range of values, the geographic locations of the values, the temporal location of the values, sub image layout, etc. In one example, the metadata includes information that allows another system to interpret the values of the image. In one example, metadata generation component 122 can incorporate the metadata into the image. However, in other examples, metadata generation component 122 can generate the metadata as a separate file or package the metadata in other ways as well. FIG. 11, described below, shows an example response that also contains examples of metadata.

Sub image generation component 124 generates sub images that corresponds to additional data that is requested by computing device 460. For example, an image may only have four channels while a computing device 460 requests more than four datasets for a given geographic region. In this example, rather than sending additional separate images or an image with more channels, the image can include sub images which are geographically duplicative such that each sub image represents different data that corresponds to the same geographic area. In some examples, sub images are used to animate a user-interface, wherein each sub image corresponds to a frame in the animation. An example of sub images is explained in greater detail below with respect to FIGS. 5-7.

Sub image layout component 126 determines the layout of the sub images in a greater overall image. For example, sub image layout component 126 can arrange the sub images in two dimensions, wherein a first dimension corresponds to temporal differences and a second dimension corresponds to varying levels/altitudes/elevations. In this example, each sub image is indicative of the same four characteristics, but each sub image represents the characteristics at a different time (i.e., the sub images across the first dimension) or different elevation (i.e., the sub images across the second dimension).

Image generation component 130 combines the sub images (or single image) into an image of a given format. For example, image generation component 130 can create a PNG image, which generally have ideal performance and compression. However, in other examples, image generation component 130 can generate other image formats, such as TIFF, GeoTIFF, NetCDF, etc. Data image generation system 100 is configured to determine what is rendered to the screen from the generated image based on what the user is interested in viewing at a particular time. Therefore, the rendered image size will not always be the same as the generated image size, since not all dimensions that are delivered will necessarily be rendered at the same time.

Image delivery component 132 packages and delivers the generated image to the requesting computing device 460. Image delivery component 132 can utilize communication component 150 through one or more networking interface protocols to deliver the image. In some examples, image delivery component 132 compresses or otherwise processes the image.

Image storage component 134 additionally can store the data image in datastore 104 or at some other location. Image storage component 134 can store metadata related to the image as well. For example, the metadata can include the party that requested the image, the data in the image, the data sources that provided the data for the image, the time the image was generated, etc.

Figure 3:
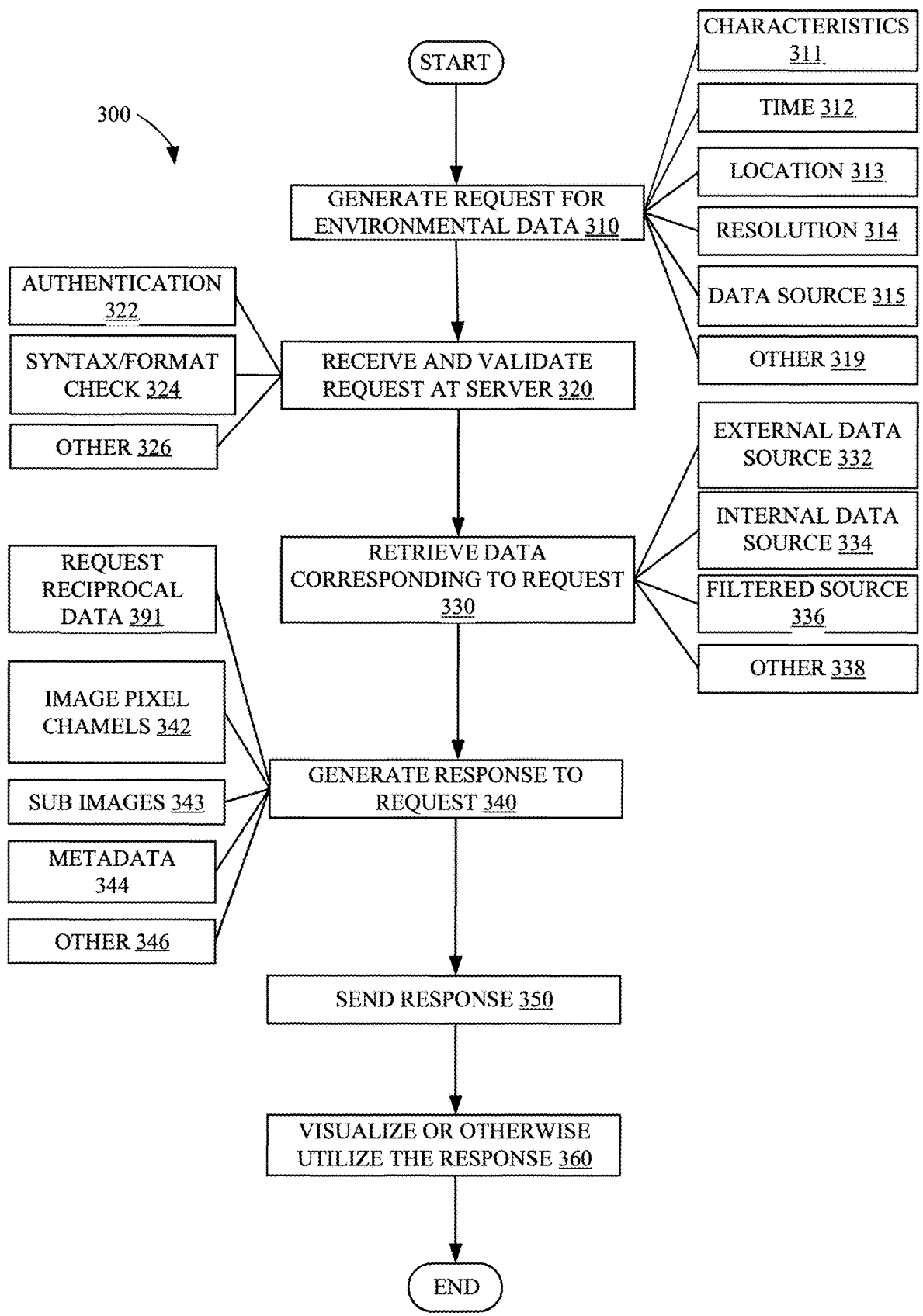
FIG. 3 is a flow diagram showing an example operation of requesting, generating and delivering a data image.

FIG. 3 is a flow diagram showing an example operation of requesting, generating, and delivering a data image. Operation 300 begins at block 310 where a request for environmental data is generated. As indicated by block 311, characteristics are included in the request. Some examples of characteristics can include temperature, wind, wind direction, precipitation, humidity, barometric pressure, wind chill, heat index, Ultraviolet (UV) index, etc. As indicated by block 312, the time for the data can also be included in the request. In one example, the time for the data can be live (e.g., current time). In another example, the time for the data can be historic or predictive. In some examples, the time in the request is indicative of the refresh rate at which the data should be updated. Additionally, in another example, the time is indicative of an animation that covers a given time period with a given number of frames that correspond to intervals within the time period.

As indicated by block 313, the location for the request can be defined. For example, the location can be defined by a bounding box that defines a portion of the earth. The location can also include projection information on how to project the two-dimensional array from a spherical shape (e.g., the earth). The location can also include the elevation and/or height above ground or sea level.

As indicated by block 314, the request can include resolution information. Resolution information is indicative of the density of data points that should be delivered over the given location. For example, a high resolution will cause a higher resolution image with more data points to be delivered. Resolution, in one example, can be represented by pixel dimensions, wherein each pixel is indicative of a datapoint (e.g., having some number of channels, such that the numbers of values each pixel contains is equal to the number of channels).

As indicated by block 315, a data source can be requested. For example, a user can request that the data comes from governmental sources. However, in another example, the data source can be nondiscriminatory such that any available data sources are utilized (e.g., mobile devices, commercial entities, etc.). As indicated by block 319, the request can include other information as well.

Operation 300 proceeds at block 320 where the request is received and validated at the server. As indicated by block 322, the validation can include some form of user authentication. As indicated by block 324, the validation can also include syntax and format checking of the request. For example, if the request is supposed to be delivered in JSON format but the request received is in XML format, the request can be denied. Or, in another example, if the request specifies one or more parameters that are not accounted for, the request can be denied. In some examples, instead of denying a request, the request can be processed for the valid portions of the request and denied for the invalid portions. As indicated by block 326, the validation can include other things as well. For example, the validation can include payment processing/fees calculation. In another example, the validation can include denial of service attack/defense mechanisms.

Operation 300 proceeds at block 330, where the data corresponding to the request is retrieved. As indicated by block 332, the data can be retrieved from an external data source, such as, for example, users that are part of an environmental data monitoring program (e.g., see U.S. Pat. No. 10,437,814). As indicated by block 334, the data can also be retrieved from an internal data source. For example, various environmental characteristics may be retrieved and stored on the server. As indicated by block 336, the data sources can be filtered according to parameters in the request. Additionally, as indicated by block 338, the data can be retrieved in other ways or from other sources as well.

Operation 300 proceeds at block 340 where the response to the request is generated. As indicated by block 341, the reciprocal data from the request is included in the response. For example, in a case where temperature and wind are requested, then temperature and wind data will be in the response. As indicated by block 342, the data can be stored in image pixel channels. For example, in a 32 bit-depth PNG image, the data can be stored as integer values in each of the red, green, blue, and alpha channels of the image, where the values in each channel can be between zero and two-hundred and fifty-five. In some examples, each channel represents its own characteristic. Additionally, in some examples, the values of a single characteristic are distributed across multiple channels. As indicated by block 343, the data can be distributed across sub images in an overall larger data image. These sub images allow for additional data to be included in the image without being limited by the number of channels in the image. As indicated by block 344, metadata corresponding to the response is generated. In some examples, the metadata is used by the client device to interpret the values in the data image. For example, the metadata can indicate which channel contains which characteristic, what range the 0-255 values cover, etc. As indicated by block 346, the response can be generated in other ways or include other data as well.

Operation 300 proceeds at block 350 where the response is sent to the device that made the request. The response may also be sent to a local or remote data store for future retrieval. Operation 300 then proceeds at block 360 where the response is visualized or otherwise utilized by the mobile device.

Figure 4:
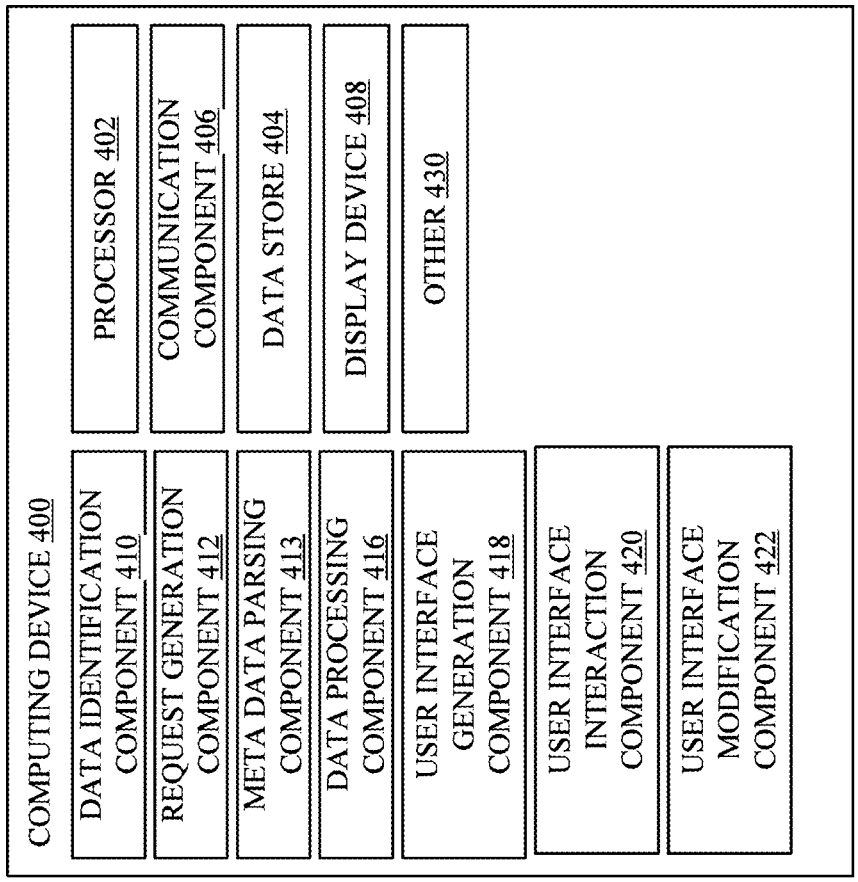
FIG. 4 is a block diagram showing a computing device, in one example.

FIG. 4 is a block diagram showing an example computing device 400. Computing device 400 can be, for example, similar to computing device 460 described above with respect to FIG. 2. Computing device 400 includes processors 402, a datastore 404, a communication component 406, a display device 408, a data identification component 410, a request generation component 412, a metadata parsing component 414, a data processing component 416, a user interface generation component 418, a user interface interaction component 420, a user interface modification component 422, and can include other items as well, as indicated by block 430.

Data identification component 410 allows a user to identify the data that they wish to receive, display or otherwise utilize. For example, data identification component 410 can include buttons of an interface adjacent to a map or weather map of a given geographic location. In operation, a user can select from these buttons, which can include various characteristics like temperature, precipitation, dewpoint, etc. When the user selects one of these characteristics, identification component 410 identifies the characteristics corresponding to the given geographic location on the map as data to be requested. Additionally, data identification component 410 can identify the data in other ways as well, such as by automatically selecting data which may be relevant to a user of computing device 400. For example, if a user selects weather radar, data identification component 410 can identify precipitation data for the past 6 hours, the present time, and the next 3 hours corresponding to a geographic location of the user.

Request generation component 412 is configured to generate a request corresponding to the data identified by data identification component 410. A request can include various identifications of the characteristics to be retrieved, and the dimensionality corresponding to these identified characteristics. For example, the dimensions could include a time window or intervals of time, a geographic location, a vertical location/elevation, a range of characteristic values, a granularity of the characteristic across the range, etc. Additionally, the request can also include a selection of which data source that the data should be retrieved from, and can include other items as well. An example of a request is shown below with respect to FIG. 10.

Metadata parsing component 413 parses the associated metadata of the response such that the data in the image can be interpreted. In some examples, the metadata includes an HTTP response that accompanies the image. In another example, the metadata is part of the image. Further, in some examples, the metadata is in a separate document from the data image document. An example of some metadata is shown below with respect to FIG. 11.

Data processing component 416 uses the parsed metadata to extract and/or interpret the raw data in the data image. Data processing component 416, in some examples, can complete decompression of the data images. In some examples, data processing component 416 uses efficient image processing libraries.

User interface generation component 418 utilizes the raw data to generate a user interface. A user interface can include a map that plots the characteristic values across a geographic area. In some examples, user interface generation component 418 includes WebGL components. For instance, the user interface generation component 418 can interpolate values between the received data points to generate a higher data point resolution.

User interface interaction component 420 allows a user to interact with the interface. For example, user interface interaction component 420 is configured to allow a user to request additional data and/or select a point on a map to get the value at that position. User interface modification component 422 allows a user to modify the interface. For instance, user interface modification component 422 can allow user to modify the colors that represent the data points. In another example, user interface modification component 422 can allow a user to adjust the interpolation between the data points. Additionally, in another example, user interface modification component 422 allows a user to add, modify, or remove particle system displays.

Figure 5:
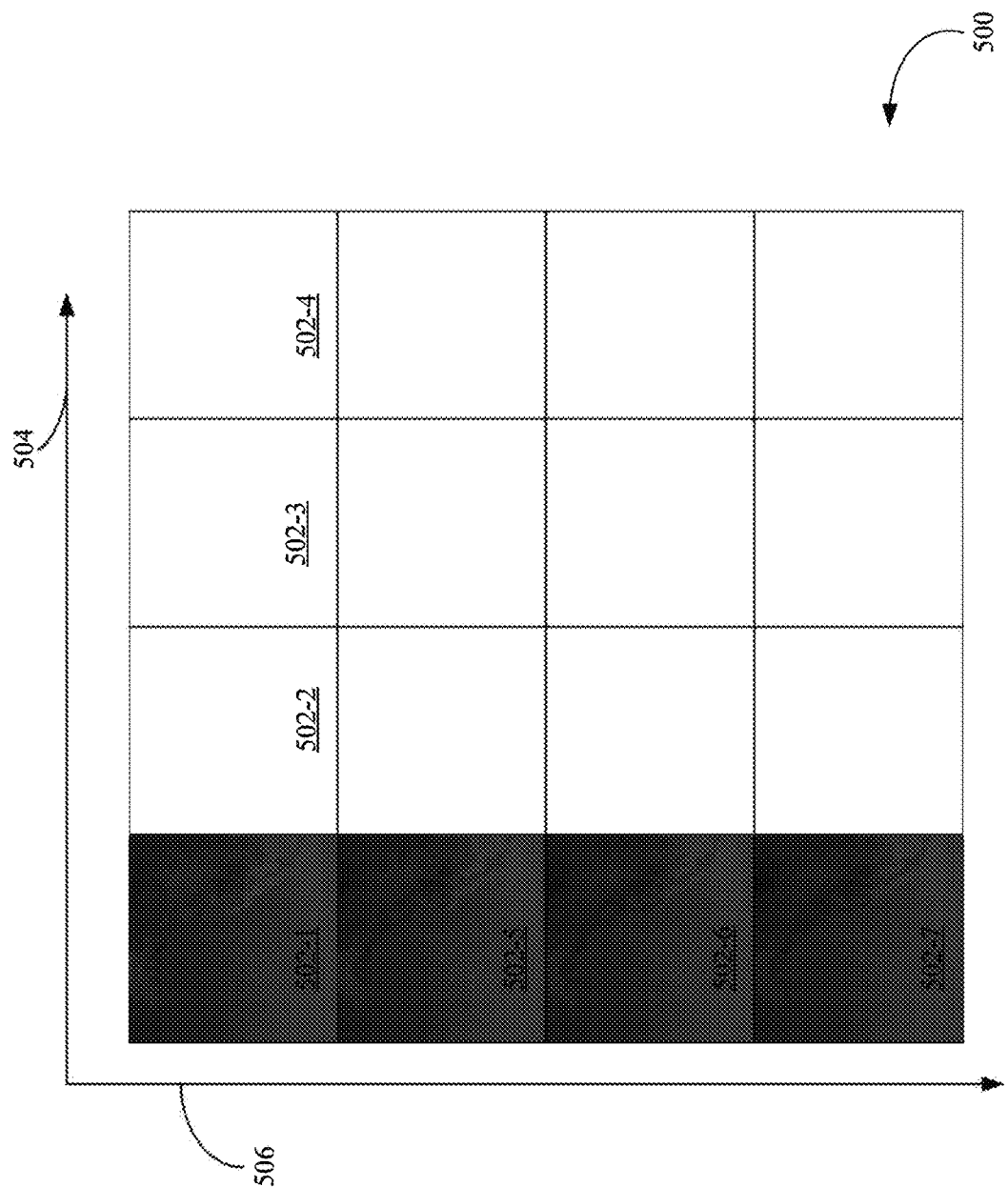
FIG. 5 is a diagram showing an example data image.

FIG. 5 is a diagram showing an example data image 500. Image 500 includes an x-axis 504 and a y-axis 506. Data image 500, as shown, includes a variety of sub images 502 that span along x-axis 504 and y-axis 506. In some examples, these sub images 502 represent the same geographic area, however, depending on their locations along the x-axis 504 and/or y-axis 506, they correspond to a different characteristic or a similar characteristic of a different dimension (e.g., time, elevation, etc.). For example, sub image 502-1 can be representative of three characteristics of a given location at two meters above ground level, moving in the x-axis 504, sub image 502-2 can be indicative of the same three characteristics at thirty meters above the ground. Similarly, sub images 502-3 and 502-4 can be indicative of the same characteristics at higher and/or lower altitudes.

In this example, the y-axis 506 can be indicative of those same values at the same location/altitude, but at a different time. For example, sub image 502-1 is indicative of the three characteristic values at two meters above the ground, while sub image 502-5 is indicative of those same values at that same elevation but one hour earlier. Similarly, sub images 502-6 and 502-7 can be indicative of the same characteristics at times farther in the past. Of course, this is only one example, and the x-axis 504 and y-axis 506 can be indicative of other dimensionalities as well.

Figure 6:
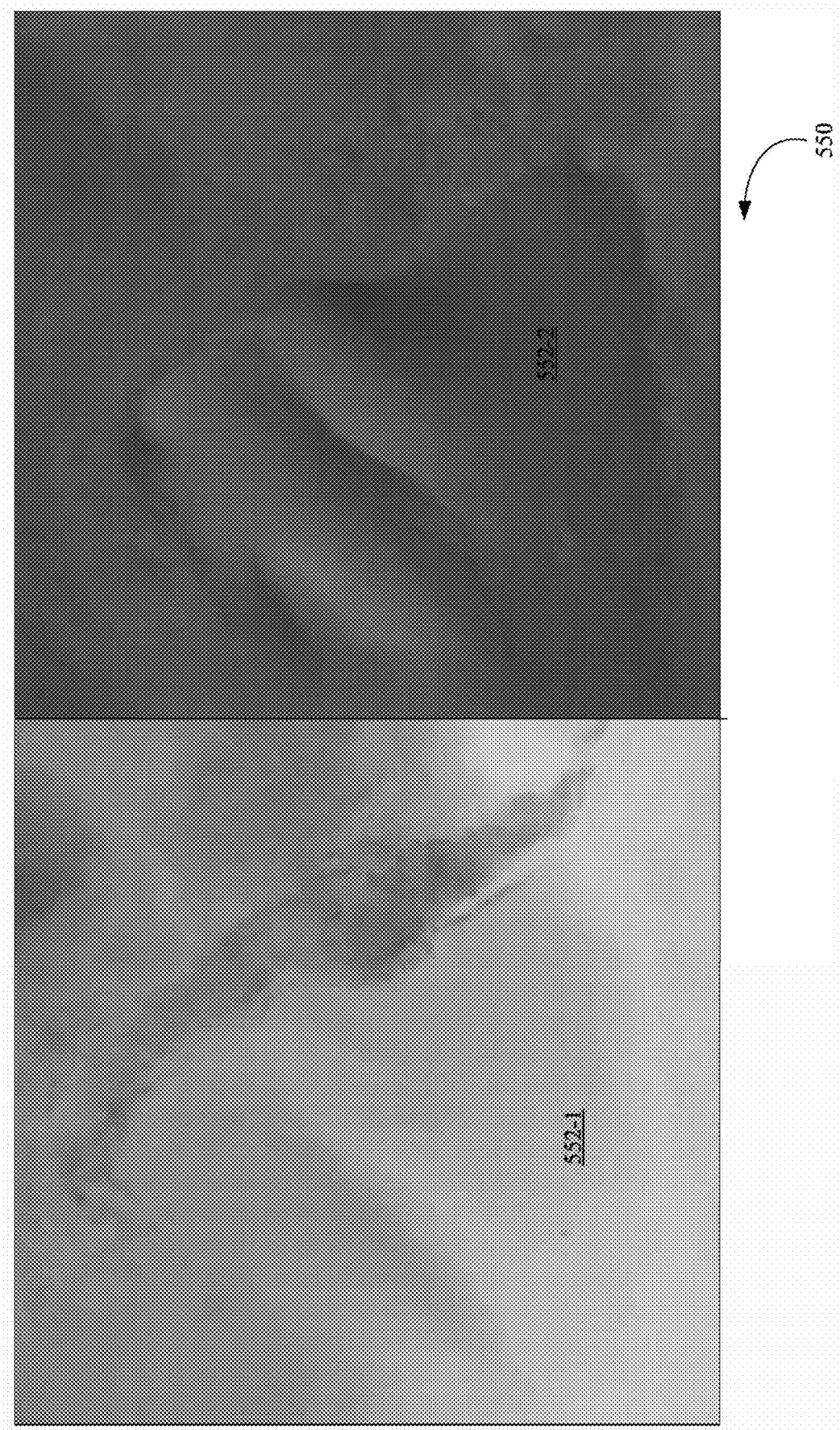
FIG. 6 is a diagram showing another example data image.

FIG. 6 is a diagram showing another example data image. In the example shown in FIG. 6, a user requests seven characteristics: temperatures, dew point, humidity, pressure, wind speed (as latitude and longitude vector components), and radar. The data corresponding to these characteristics is to be stored in image 550. In this example, image 550 only has four color channels which by themselves cannot represent seven characteristics. Accordingly, to represent these seven characteristics, four available color bands in sub image 522-1 are used to store four of the seven characteristics (e.g., temperatures, dew point, humidity, and pressure). Then, the remaining three characteristics (e.g., wind speed latitude, wind speed longitude, and radar) can be stored in three color channels of sub image 522-2. The red channel of the entire image 550 will contain both temperature (sub image 552-1) and wind speed latitude (sub image 552-2) values. The green channel would contain dew point (sub image 552-1) and wind speed longitude (sub image 552-2) values. The blue channel would contain humidity (sub image 552-1) and pressure (sub image 552-2). The alpha channel would contain radar (sub image 552-1). The alpha channel of sub image 552-2 can remain unused or can be used to store another characteristic, or one of the previously mentioned characteristics, in another dimension (e.g., at another time or at another elevation).

Any combination of channels and sub-images can be utilized to increase the amount of data that the image contains. For example, the number of characteristics (across dimensionality) available to be stored in the image can be equal to the number of channels in the image multiplied by the number of sub-images in the image. In some examples, where the variation in a characteristic is low, more than one characteristic can be stored in the same channel. For instance, both wind speed and direction can be stored in an 8-bit depth channel (e.g., where values 0-64 can be indicative of wind speeds with direction North, values 64-128 can be indicative of windspeeds with direction South, values 129-192 can be indicative of windspeeds with direction East, and values 193-255 can be indicative of windspeeds with direction West).

Figure 7:
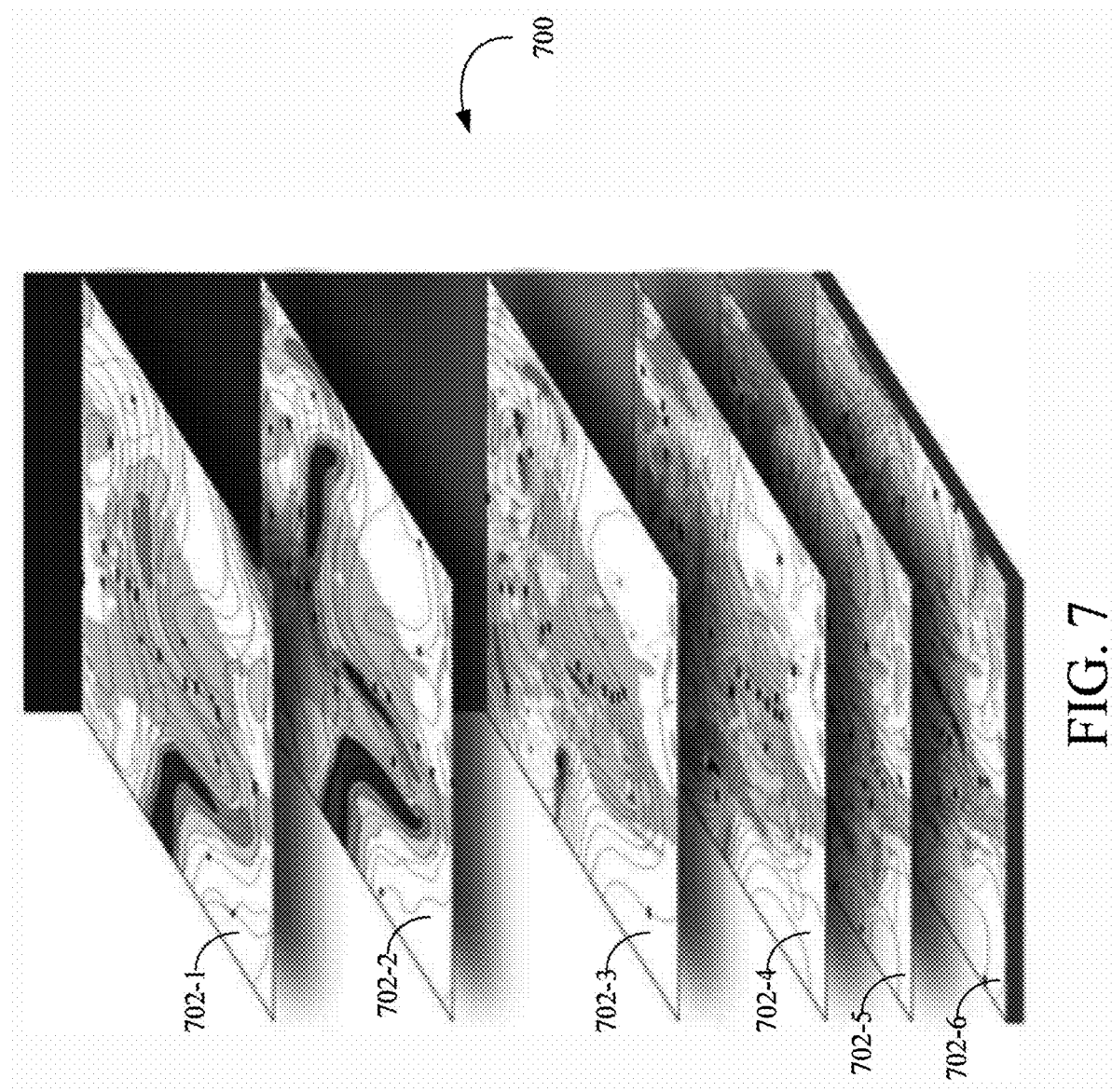
FIG. 7 is a diagram showing example data across differing elevations.

FIG. 7 is a diagram 700 showing example data across differing levels 702. Level, elevation, and/or altitude are example dimensions that can be a parameter of a data image. A user may ask for a near-surface characteristic, such as temperature, or they may be more interested in higher altitude winds (e.g., for a wind farm or aviation). The shown characteristic at six different levels 702-1, 702-2, 702-3, 702-4, 702-5, and 702-6 can be incorporated into a single data image, for example, by utilizing three channels of two sub images, six channels of a single sub image, etc. Data across a wide range can be stored in channels of the image based on fixed intervals. This may look like humidity on each floor of a building (e.g., segmenting a building into separate floors) or wind speeds from the surface up to 35,000 feet at 5,000 feet intervals.

Figure 8:
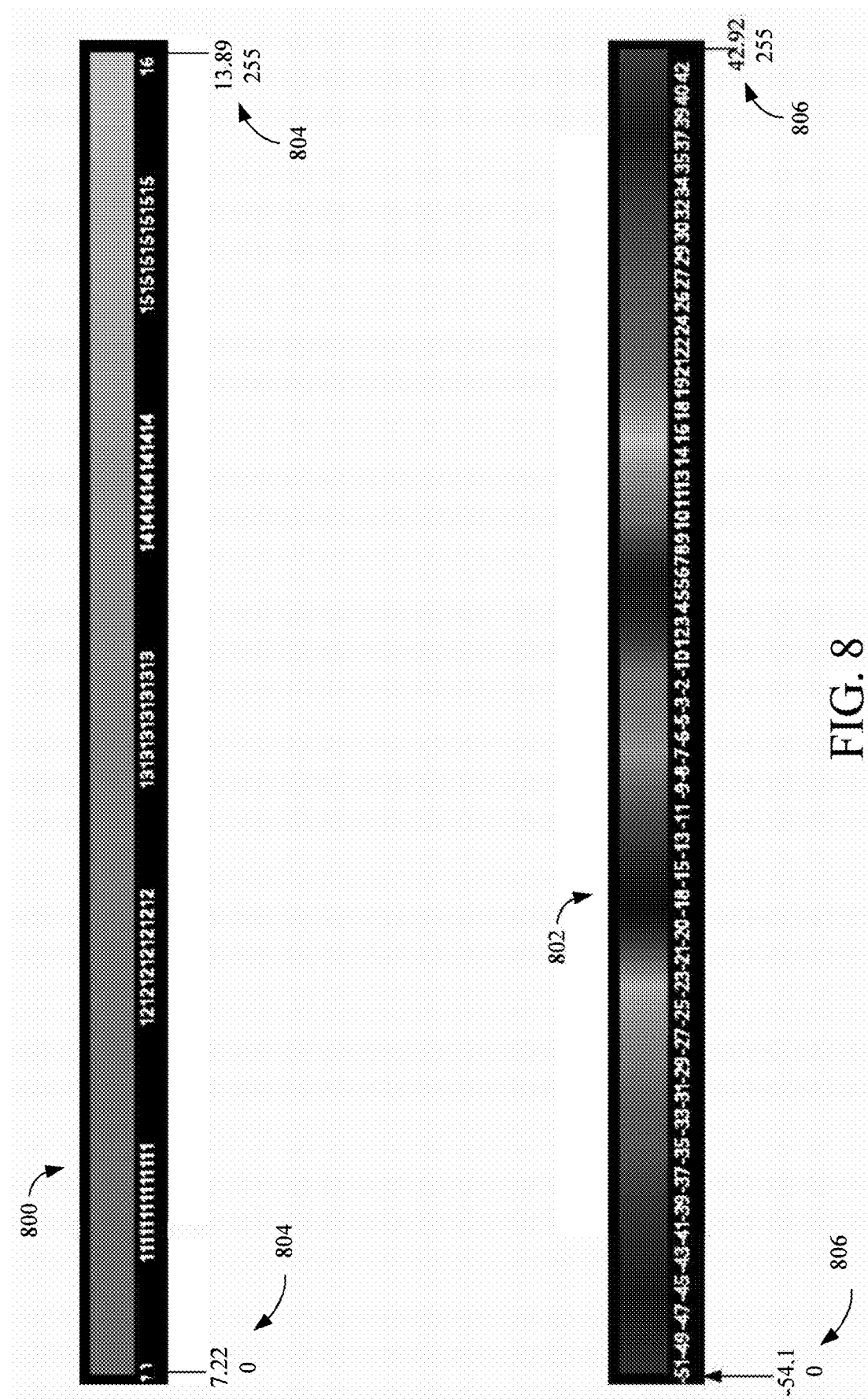
FIG. 8 is a diagram showing example data ranges.

FIG. 8 is a diagram showing example data ranges 800 and 802. Data in a data image, such as temperature and/or wind speed, can be delivered to a user with varying amounts of accuracy and interpolation depending on the user needs. The data range (minimum and maximum) can be scaled either to the minimum and maximum values found for the specific region requested, or it can be scaled to a static range so that it is consistent regardless of the region it is requested for (e.g., a value of 0 equals 0 degrees Celsius and a value of 100 equals 100 degrees Celsius). Therefore, a data scale can be tight with a very small step size for a specific region, perhaps only varying only a few degrees over a small area for maximum accuracy. For example, a metro view may only need to vary 10 degrees and can step 0.1 degree to increase the precision and total possible values returned in that small range. In another example, as shown in data scale 800 at reference numeral 804, the temperature data can range from 7.22 to 13.89. In a single channel of a 32-bit image, this will be scaled to a range between 0 and 255. Thus, each unit step in the channel value represents a temperature change of 0.026 degrees.

In another example, a user can request global data that contains a much larger data range that encompasses all possible values globally. This step size could jump several degrees in between data points, only getting more refined as the user zooms into a chosen area. As shown in data scale 802 at reference numeral 806, the temperature data ranges from −54.1 to 42.92. In a single channel of a 32-bit image, this will be scaled to a range between 0 and 255. Thus, each unit step in the channel value represents a temperature change of 0.38 degrees.

Figure 9:
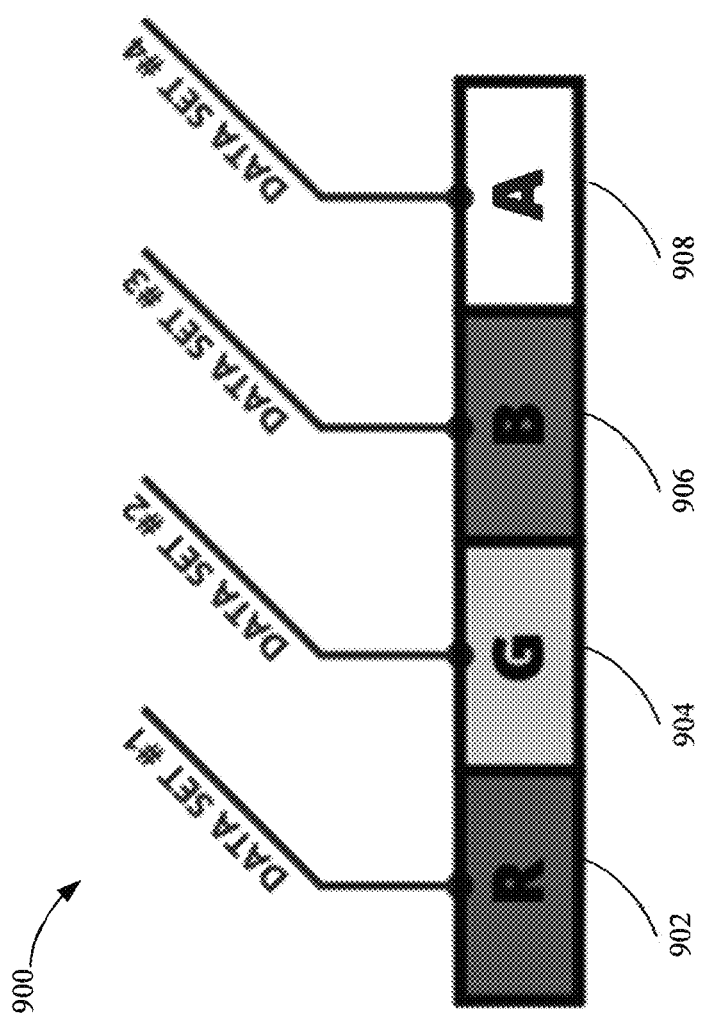
FIG. 9 is a diagram showing example channels of an example data image.

FIG. 9 is a diagram showing the channels 900 of a pixel in an example data image. In one example, the data image is in a PNG image format. The PNG image format allows data storage in four color channels (red channel 902, green channel 904, blue channel 906, and alpha channel 908). The bit depth of the image can be changed to store a varying range of values per channel. For example, an image having 8 bits per channel can store a number in the range of 0-255 per channel. Or, in another example, an image having 4 bits per channel can store a number in the range of 0-15 per channel. The PNG format is typically used to represent lossless compression raster images. Web browsers and devices have been designed to use this format very efficiently when delivering and reading data. In one example, the PNG channels represent data, and the data image generation system determines the representation of that data and renders it accordingly.

Figure 10:
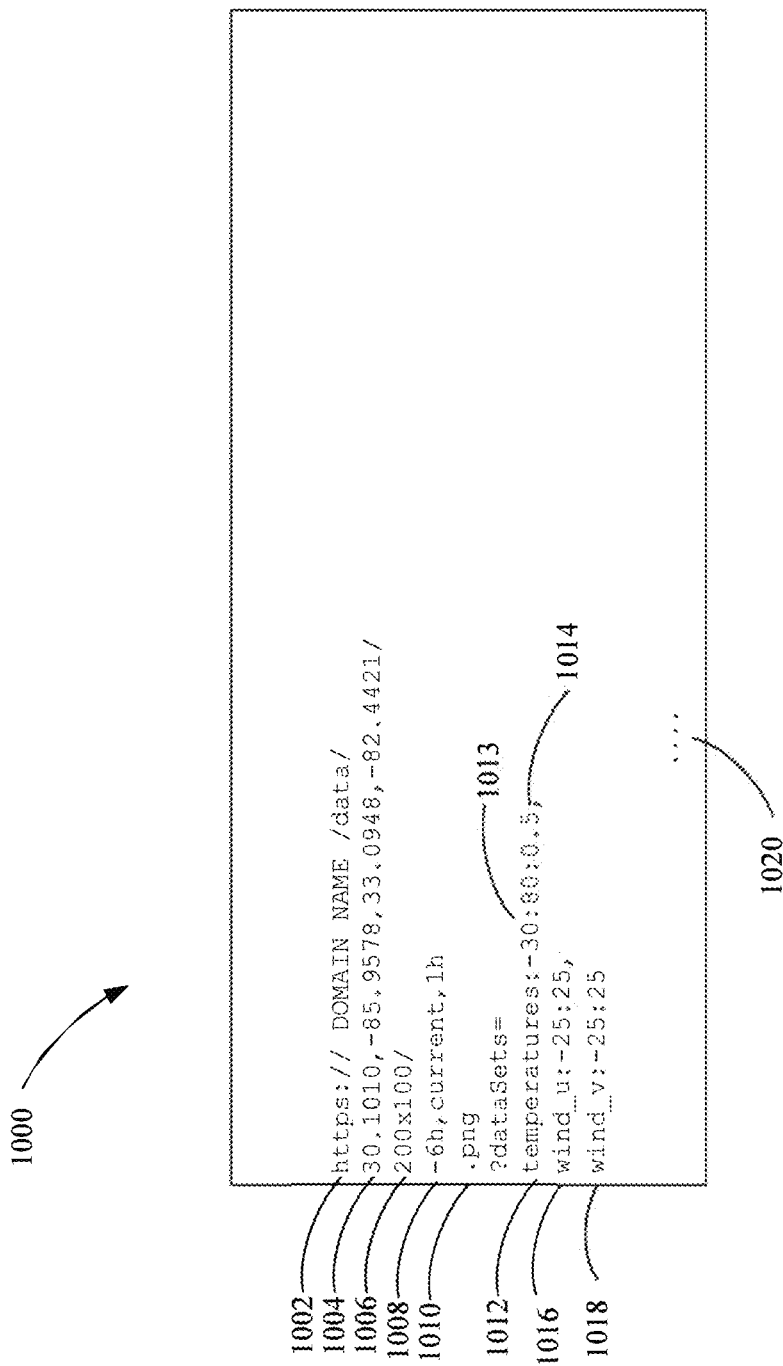
FIG. 10 is a diagram showing an example request for environment data.

FIG. 10 is a diagram showing an example request 1000 for environment data. Request 1000 includes URL portion 1002, location portion 1004, resolution portion 1006, time portion 1008, format portion 1010, characteristic portion 1012, range portion 1013, step portion 1014, characteristic portion 1016, characteristic portion 1018, and can include other portions as well, as indicated by portion 1020. Request 1000 defines parameters that indicate the data being requested. URL portion 1002 contains information indicative of the web location where the request is to be sent. In other examples, URL portion 1002 can indicate a different location, such as an IP address or other location identifier.

Location portion 1004 contains information indicative of a geographic location. In one example, this geographic location is defined by a bounding box defined by four points. For instance, as shown, the bounding box is defined in one corner by latitude 30.1010, longitude −85.9578, and in a second quarter by latitude 33.0948, longitude −82.4421. In other examples, the geographic location can be defined in other ways as well. For example, geographic location can be defined in a non-box shape or can include projection information.

Resolution portion 1006 contains information indicative of the resolution of the requested image. The resolution of the requested image also has an effect on the number of data points that will span across the geographic location indicated in location portion 1004. As shown, the image is requested to be a 200×100 pixel image. Therefore, in an example where the image has 3 channels, 60,000 data points may be requested.

Time portion 1008 contains information indicative of the time for which the characteristic data should be retrieved. As shown, the time is in a range format that ranges from six hours in the past to current with a one-hour interval. However, it is expressly contemplated that difference range formats and/or time intervals can be utilized as well.

Format portion 1010 contains information indicative of the format that the data image should be in. As shown, the format is a PNG image. However, in other examples, a different format can be utilized as well, such as TIFF, GeoTIFF, NetCDF, JPG, etc.

Characteristic portion 1012 contains information indicative of a characteristic that should be included in a channel of the data image. As shown, the characteristic is temperature. Range portion 1013 contains information that modifies the data retrieved in the preceding characteristic. As shown, range portion 1013 indicates that the temperature values to be retrieved should be in the range from negative thirty degrees to eighty degrees. Step portion 1014 contains information that provides parameters to the data retrieved in the preceding characteristic. As shown, step portion 1014 indicates that the temperature value should be retrieved with a granularity of 0.5° (e.g., each unit value in the channel is indicative of 0.5 degrees). For example, a value of zero in a channel of a pixel would be indicative of negative thirty degrees, while a value of two would be indicative of negative twenty-nine degrees.

Characteristic portion 1016 contains information indicative of a characteristic that should be included in another channel of the data image. As shown, the characteristic is wind component speed latitude. Characteristic portion 1016 includes another range portion that indicates that the wind component speeds from −25 m/s to positive 25 m/s should be retrieved. Characteristic portion 1016 does not include a step portion, and therefore a default step value will be used. In some examples the default step value can be the maximum amount of granularity that the server can provide. For instance, the maximum value can be the range minus the minimum value divided by the depth of the channel. In another example, the default step value can be the maximum precision that a measuring device can accurately provide. In another example, the default step value can be one unit (e.g., 1 m/s).

Characteristic portion 1018 contains information indicative of a characteristic that should be included in another channel of the data image. As shown, the characteristic is wind component speed longitude. Characteristic portion 1018 includes another range portion that indicates that the wind component speeds from −25 m/s to positive 25 m/s should be retrieved. Characteristic portion 1018 does not include a step portion and therefore a default step value will be used. As noted above, in some examples, the default step value can be the maximum amount of granularity that the server can provide. Additionally, it is expressly contemplated that other step values can be utilized as well.

FIG. 11 is a diagram showing an example response header 1100. Response header 1100 includes dimensional portion 1102, characteristic definition portion 1104, characteristic range portion 1106, characteristic unit portion 1108, characteristic unit portion 1110, sub image layout portion 1120, time portion 1122, time step portion 1124, sub image count portion 1126, and can include other items as well, as indicated by portion 1130.

Dimensional portion 1102 contains information indicative of the dimensionality of the data image. As shown, the width of the image is 200 pixels, and the height is 100 pixels. This corresponds to the resolution portion 1006 of the request, as indicated above with respect to FIG. 10.

Characteristic definition portions 1104 contain information indicative of the characteristic corresponding to one of the channels. In this instance, the first characteristic is temperature and is stored in the red channel. The second characteristic is wind (latitudinal velocity) and is stored in the green channel. The third characteristic is wind (longitudinal velocity) and is stored in the blue channel.

Characteristic range portions 1106 contain information indicative of the range of values in the first characteristic. In this instance, the temperature values range between −30 and 80. The wind values range between −25 to 25.

Characteristic step portions 1108 contain information indicative of the step and characteristic value per unit of value in the channel. In this instance, the temperature step is 0.5°. The wind step is, in this example, one meters per second.

Characteristic unit portions 1110 contain information indicative of the units that the characteristic is represented in. In this instance, the temperature unit is degrees Celsius. The wind unit is meters per second.

Sub image layout portion 1120 contains information indicative of the layout of the sub images. In this instance, the sub images are laid out in columns. For instance, each column of sub images corresponds to a different time.

Time portion 1122 contains information indicative of the timing of the data image values. In this instance, the earliest time corresponding to the values is Jun. 8, 2021 at 1 AM, and the latest time corresponding to the values is Jun. 8, 2021 at 7 AM (which, in this instance, was the current time).

Time step portion 1124 contains information indicative of the steps of time per column of sub images. In this instance, each column is indicative of a one-hour change in time. Sub image count portion 1126 contains information indicative of the number of sub images. In this instance, there are six sub images that span across six columns.

Figure 12:
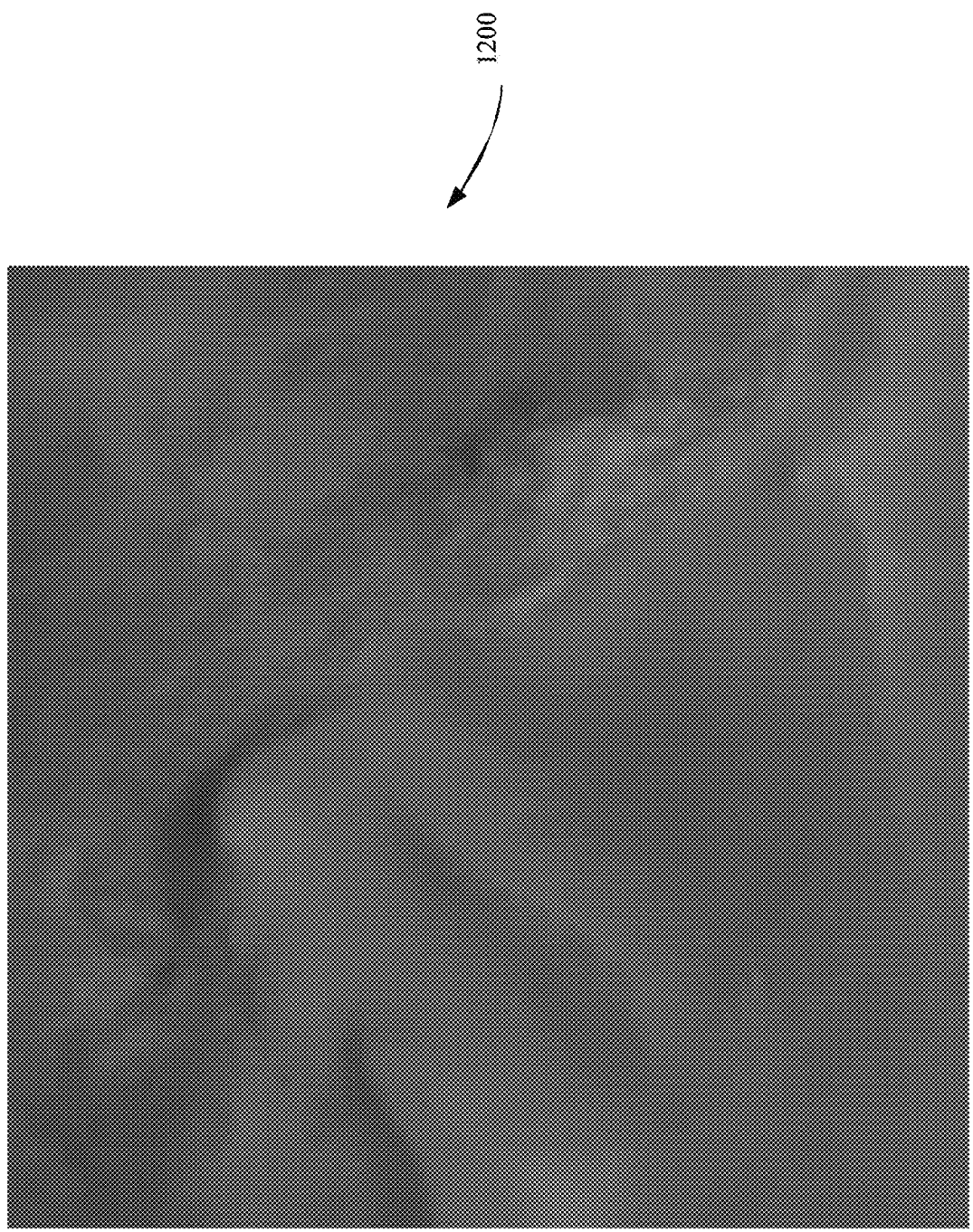
FIG. 12 is a diagram showing an example data image.

FIG. 12 is a diagram showing an example sub image 1200 of a data image. Sub image 1200 corresponds to the response 1100 described above with respect to FIG. 11. The red channel includes temperature data on a scale of −30 C to 80 C at a 0.5 C step interval. This means that the data value of −30 C would map to a channel value of 0, and a data value of 80 C will correspond to a channel value of 220. The green channel includes wind speed U component (the longitudinal speed of the wind) on a scale of −25 to 25. As shown in FIG. 10, no interval/step was specified so the server scaled the data across all available 256 values, leaving us with a step of 0.1953125 (e.g., (25−(−25))/256). A channel value of 0 will map to −25 m/s (west winds at 25 m/s) and 255 will map to 25 m/s (east winds at 25 m/s). The blue channel includes wind speed V component (the longitudinal component of the wind). Sub image 1200 is shown in "true color" meaning that image is displayed using the RGB values corresponding to red-blue and green pixel values for illustrative purposes.

Figure 13:
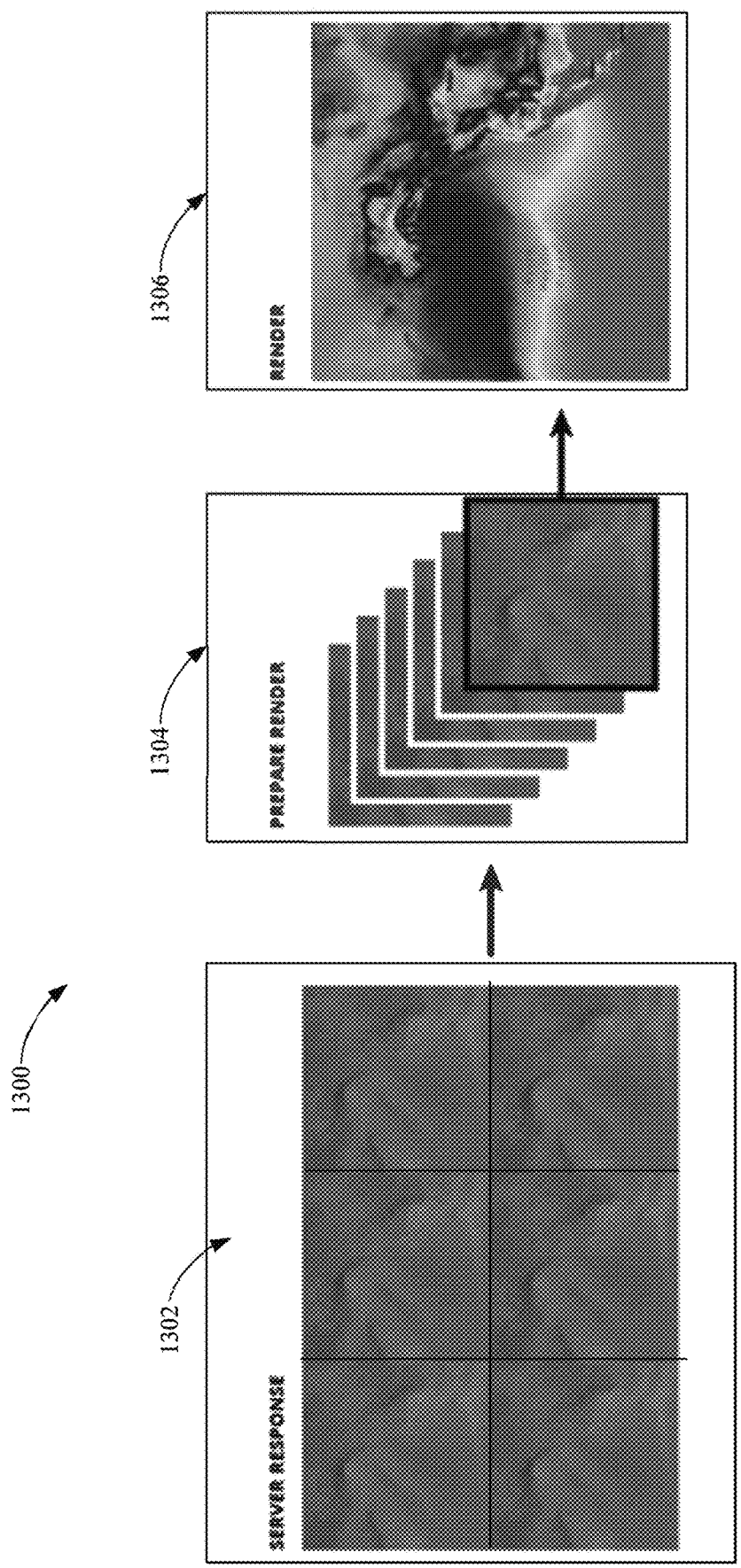
FIG. 13 is a flow diagram showing an example operation of receiving in rendering a data image.

FIG. 13 is a flow diagram showing an example operation 1300 of receiving and rendering a data image. At block 1302, the server response is received. In this example, a data image with six sub images is shown as being received. At block 1304, the server response is processed. As illustratively shown, the six sub images are processed into 6 images. These images include a number of channels that correlate to different characteristics. The channel values are used to determine the characteristic values. At block 1306, an interface is generated. As illustratively shown, the interface represents temperatures. These temperatures were extracted from one or more of the channels from one or more of the sub images in block 1302. A graphics processing unit (GPU) of the user device creates the rendering by binding the data (e.g., from the sub image) to a texture/color palette. In some examples, the data image generation system provides any other relevant information to the GPU at the same time that is required for rendering the data, such as the color scale to map values to, matrix information about how to transform the data (map projections, positioning the output on a map, etc), and any other information of relevance.

Figure 14:
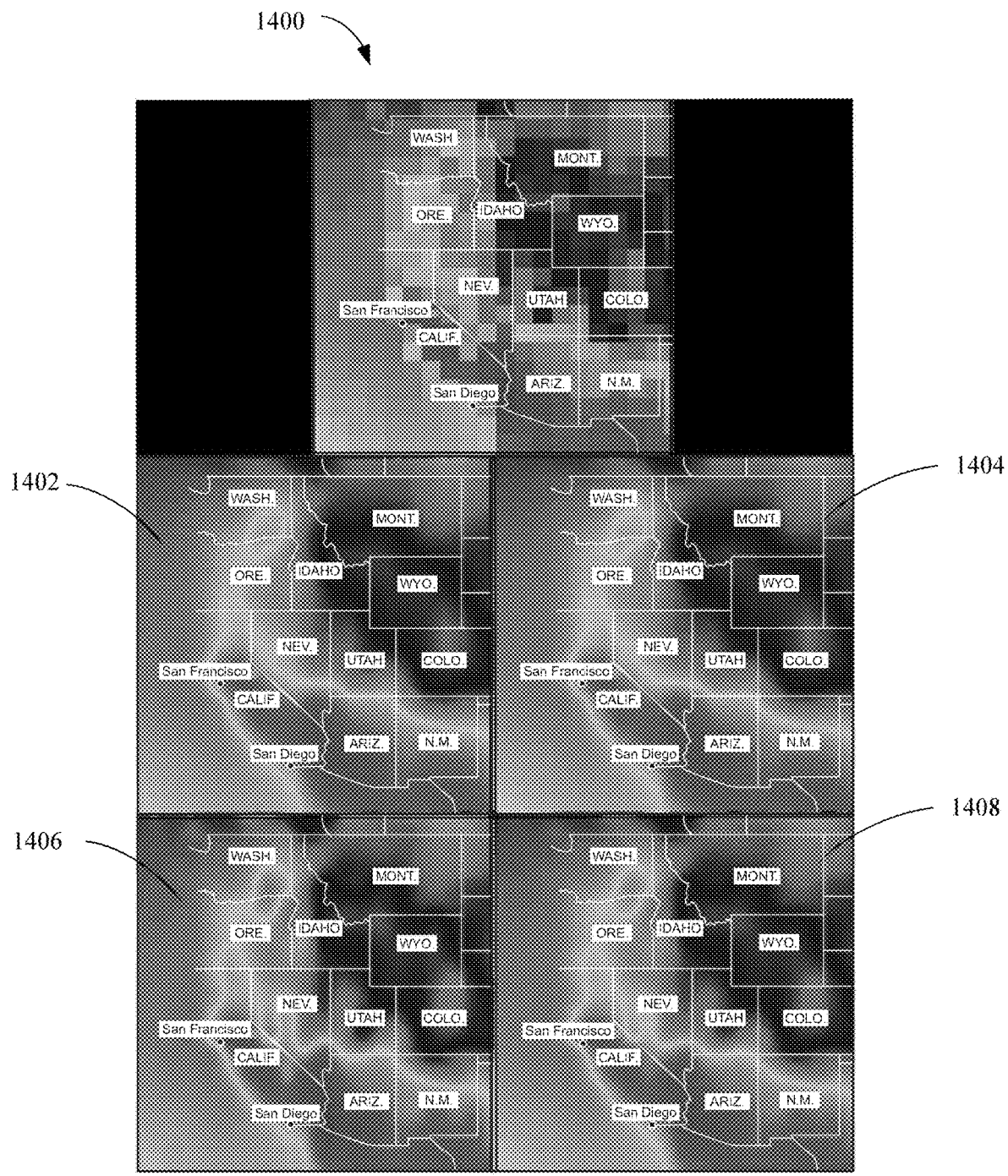
FIG. 14 is a diagram showing various example renderings of a data image.
Figure 15:
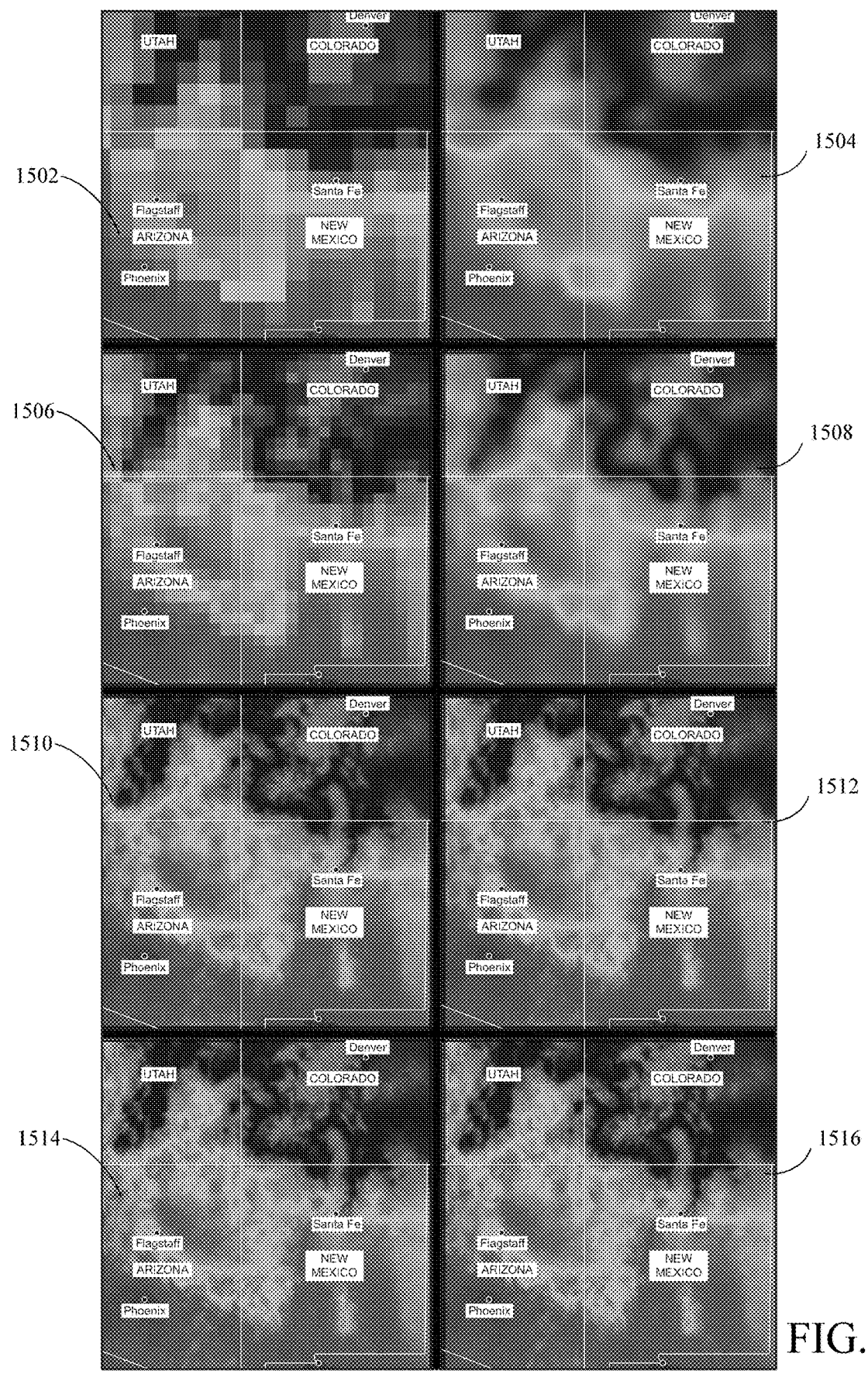
FIG. 15 is a diagram showing various example renderings of the data image having different interpolation settings.

FIGS. 14 and 15 are diagrams showing various renderings of data images. As shown these renderings are generated using OpenGL/WebGL. In other examples, the renderings could be generated in other ways as well. OpenGL/WebGL ("GL") is efficient at performing fast interpolation and resampling on texture (raster) data. This allows a relatively small image, (e.g., 256×256 pixels) to be rendered in full screen without seeing pixelation or seeing a loss in data quality. The result is a smooth contoured representation of the data at varying zoom levels.

GL can perform bilinear interpolation on textures when rendering them via shaders. Bilinear interpolation performs basic linear interpolation in the X and Y directions using four data points and combines them to perform smooth steps between the values between them, which gets rendered to the screen. For example, if there were only four data points at the corners of an interface screen, the result would be a blending of values across the X and Y directions.

Image 1400 is a direct rendering of a data image without interpolation. Image 1402 is a rendering of a data image using bilinear interpolation. Image 1404 is a rendering of a data image using by cubic interpolation. Image 1406 is a rendering of a data image using Bicubic Hermite interpolation. Image 1408 is a rendering of a data image using biquadratic interpolation.

Image 1502 is a rendering of a data image without interpolation. Image 1504 is a rendering of a data image with the same resolution as image 1502, however interpolation has been used to render the data. Image 1506 is a rendering of a data image without interpolation. Image 1508 is a rendering of a data image with the same resolution as image 1506, however interpolation has been used to render the data. Image 1510 is a rendering of a data image without interpolation. Image 1512 is a rendering of a data image with the same resolution as image 1510, however interpolation has been used to render the data. Image 1514 is a rendering of a data image without interpolation. Image 1516 is a rendering of a data image with the same resolution as image 1514, however interpolation has been used to render the data.

Figure 16:
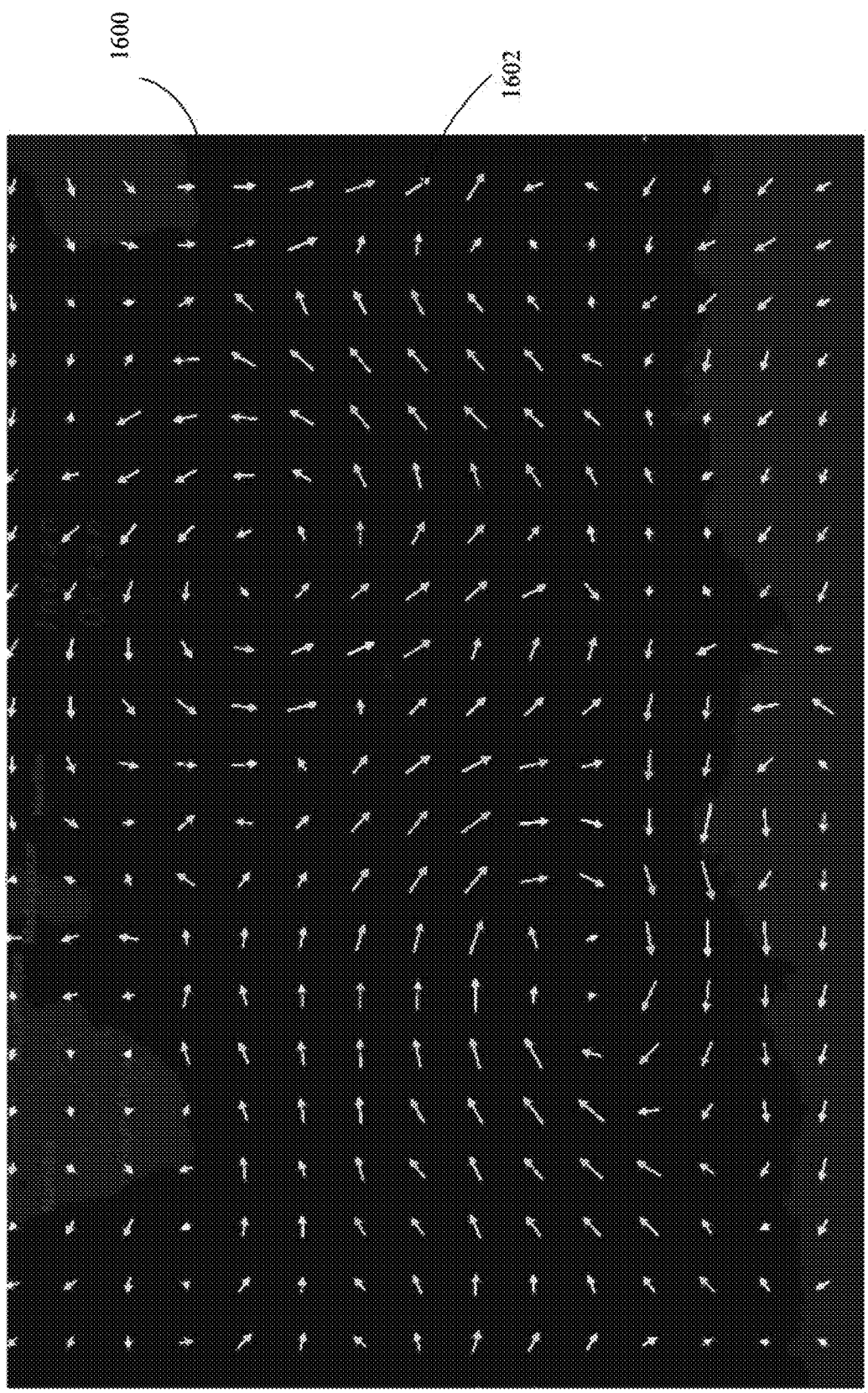
FIG. 16 is a diagram showing an example rendering of a data image containing wind characteristic data.

FIG. 16 is a diagram showing an example rendering 1600 of a data image containing wind characteristic data. In the example rendering 1600, interpolation has also been used to generate the rendering. In this example, rather than colors, arrows 102 are used to display the data. The length arrows 1602 indicates windspeeds and the direction of arrows 1602 indicate wind direction.

FIG. 17 is a diagram showing different renderings of a data image with different settings. Block 1702 indicates an example color scheme for wind speeds. This color scheme, in one example, results in an output similar to the interface shown in block 1704. The color scheme can be adjusted to interpose weight values between their defined color stops, which results in a smoother gradient across values for the same data. This is shown, for example, in block 1706. As shown in block 1708, the color scheme can also be adjusted to include other hues.

Figure 18:
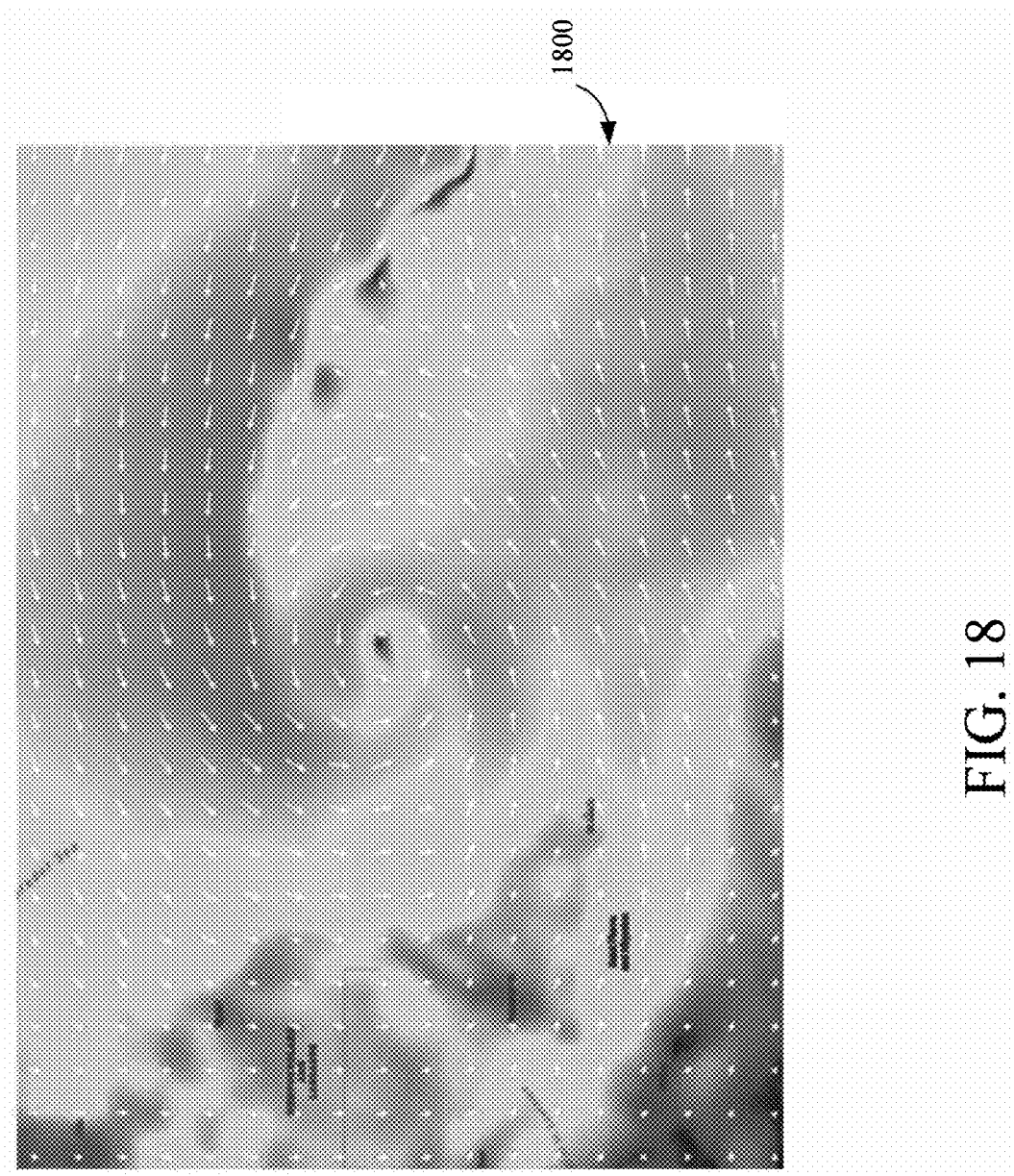
FIG. 18 is a diagram showing an example rendering of a data image.

FIG. 18 is a diagram showing an example rendering 1800 of a data image. As shown, this rendering shows vector flow fields. This type of visualization can be used for data sets that represent flow and movement across a spatial dimension, such as air or a fluid and even force. Additionally, this type of visualization can represent wind speed and direction, oceanic currents or ocean swells, and wave heights. The raw data from one or more data points (from the pixels of the data image) can be plotted on a regular XY grid. Once plotted, the values between the data points can be determined by interpolation. Then, data points and interpolated values can be rendered according to desired outputs (e.g., custom GL shaders). The result is being able to quickly interpret the directional flow and velocity of the air or fluid across the spatial dimension and pick out specific features and characteristics within that flow. An example of this is shown in rendering 1800.

Figure 19:
FIG. 19 is a diagram showing an example rendering of a data image utilizing particles.

FIG. 19 is a diagram showing an example rendering 1900 of a data image utilizing particles. Rendering 1900 includes a visualization representing wind using a particle field system. The principle behind an example particle field system is to generate a series of random particles across the entire field system. Then, each particle's position is updated relative to the speed and direction from the underlying raw data for the field.

Using the same wind speed data set from the vector field example described above with respect to FIG. 18, the data can be rendered and animated as particles using this technique. The indexed raster data delivered by the image server is not limited to mapping to two-dimensional use cases, however. This same data can be fed into three-dimensional models and environments to provide accurate weather and environmental information to 3D scenes for things like sky and precipitation effects or movement of vegetation in response to wind speed information.

Figure 20:
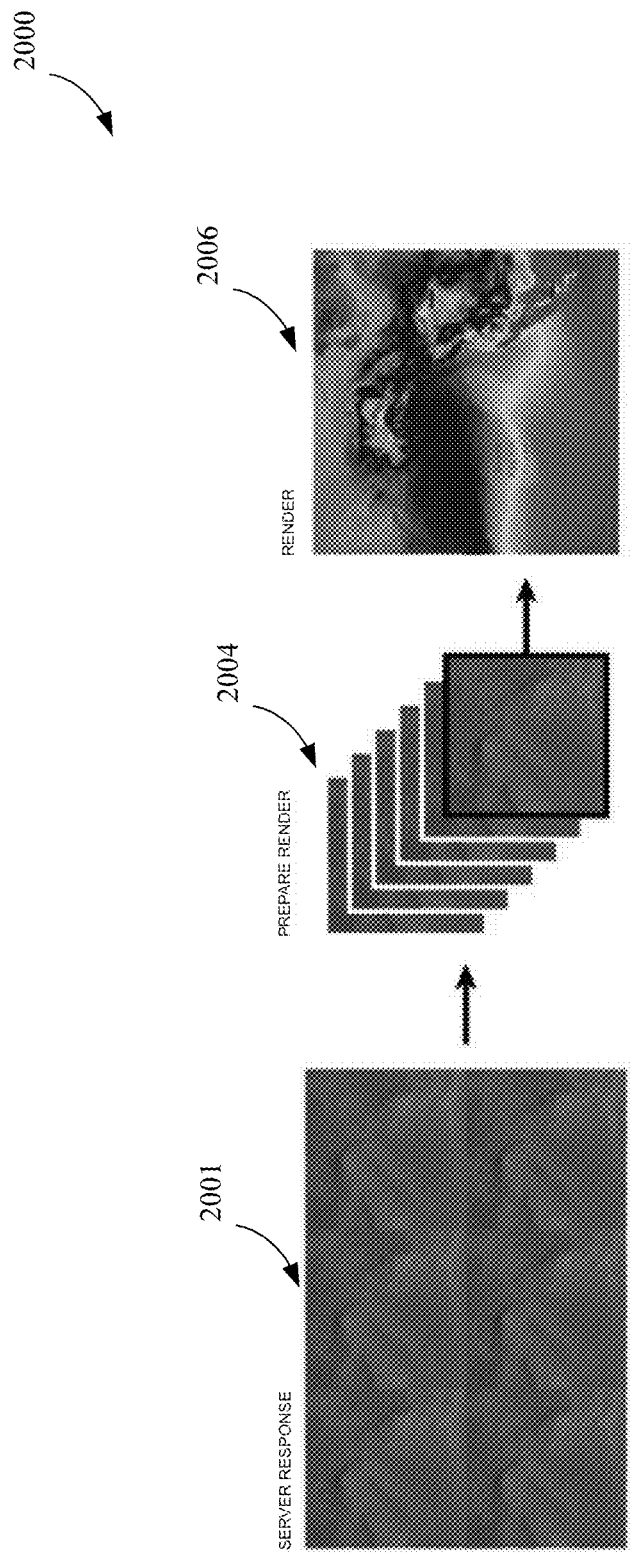
FIG. 20 is a flow diagram showing an example operation of receiving and rendering a data image.

FIG. 20 is a flow diagram showing an example operation of receiving and rendering a data image. In additional to rendering static or animated visualizations for a single data set at a specific time interval, the client can also animate data across time if a time range and/or multiple intervals are requested from the image server. As indicated by block 2001, the client device receives a data image containing multiple sub-images. As indicated by block 2004, the sub images can be processed into individual images. As indicated by block 2006, the sub images can correspond to frames in an animation.

As described above with respect to FIG. 13, the data image generation system can take the gridded sub images from the data image and crop them into an array of time ranges. This array of time-specific sub images is then cached and uploaded to the GPU as needed as a texture during the playback of a data set's animation. One technique for displaying an animation is by sequentially rendering images for a set duration. This can sometimes result in choppy animations.

Another example approach involves blending between each interval across time using linear interpolation. This approach can result in a smoother animation, especially for data that may have larger time gaps between each interval (e.g., 1 hour vs 5 minutes). Similarly, other custom visualizations can be animated as well by simply stepping through the available time intervals and interpolating between each frame.

Figure 21:
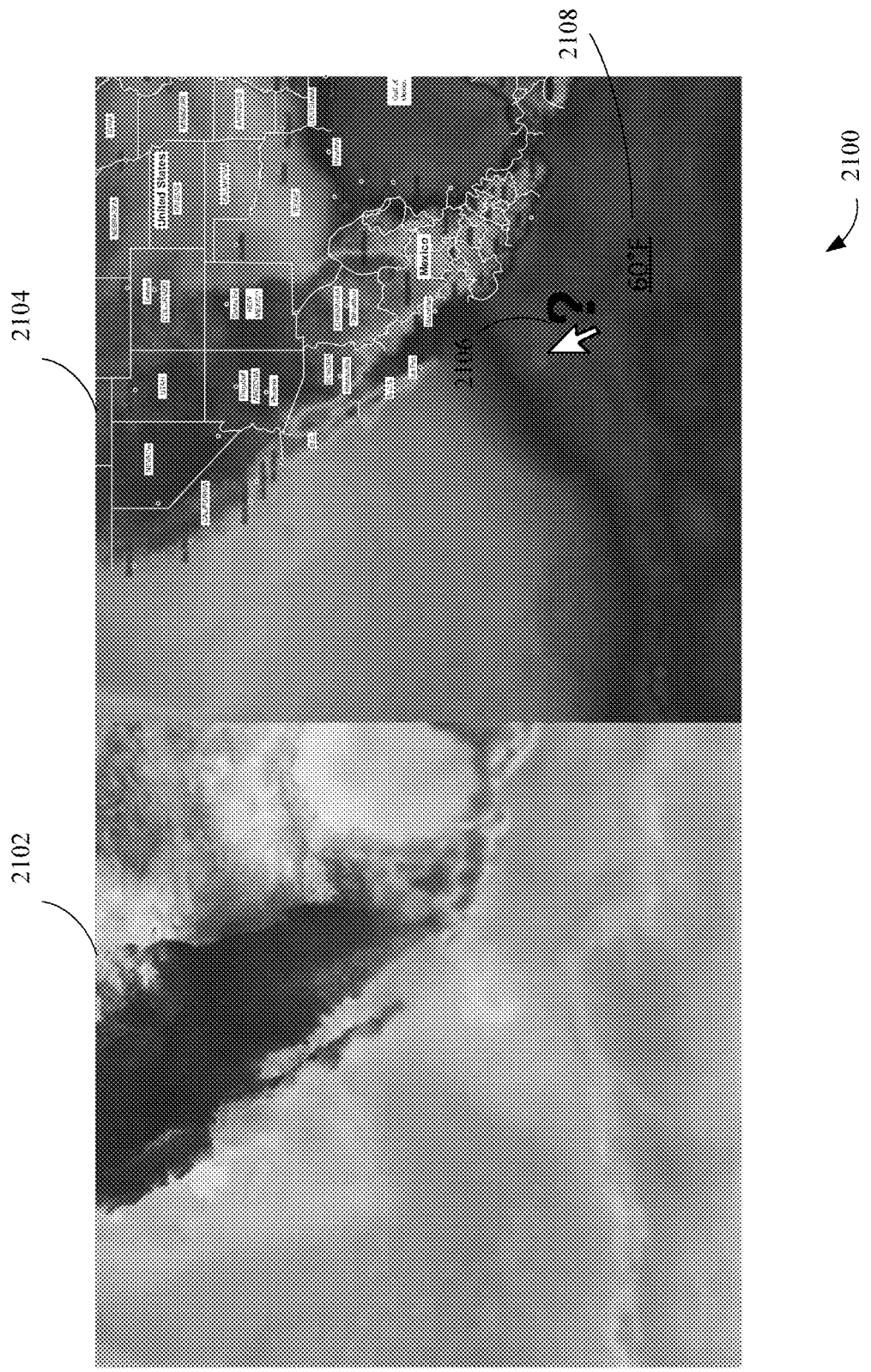
FIG. 21 is a diagram showing example renderings of data images.

FIG. 21 is a diagram showing renderings of data images. The data image generation system can use the raster data returned by the image server along with the band index and value scaling information provided by the image's headers (or other metadata sources) to determine the raw data value at a given pixel coordinate on the image. Using this information, the application can allow a user to mouse over or click/tap a position on the data, such as a map, and the application can return the retrieved value (or interpolated value, when the user clicks a position between two retrieved data points) at that point.

In the shown rendering 2100, images 2102 and 2104 are rendering dew points (response data returned by the image server on the left 2102, rendered output on the right 2104 with color scale applied). The user has actuated mouse cursor 2106 to a point in the ocean where the dew point is sixty degrees Fahrenheit, as indicated by indication 2108.

Figure 22:
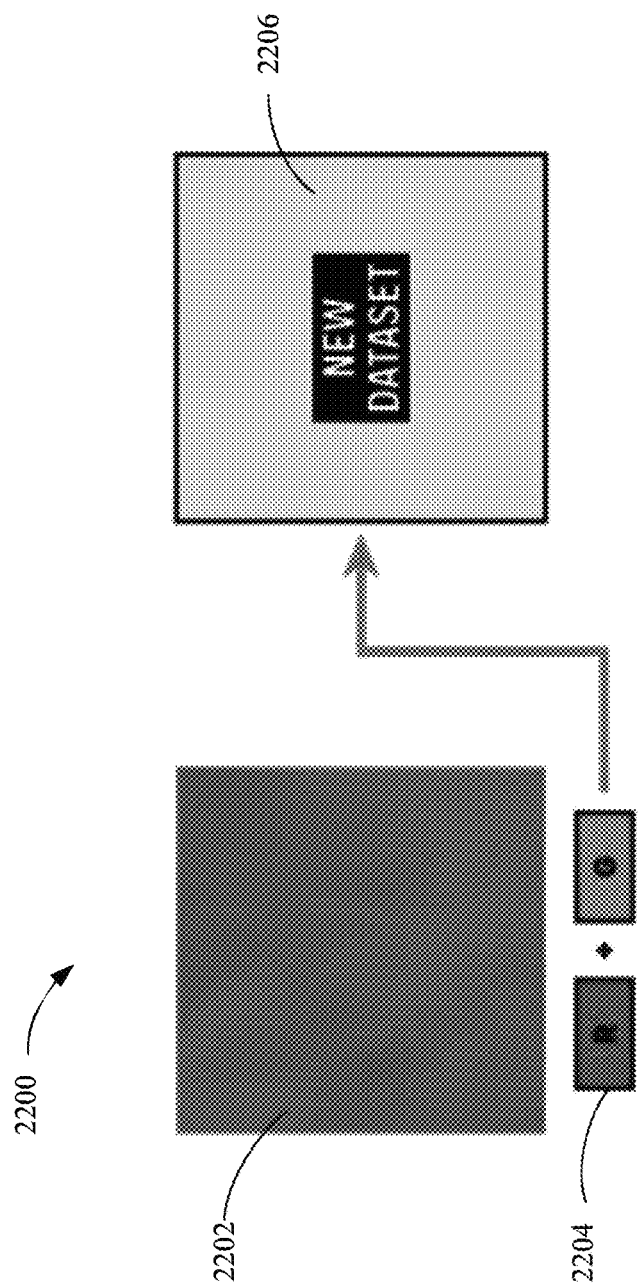
FIGS. 22-24 are diagrams showing example operations of obtaining new datasets from a data image.
Figure 23:
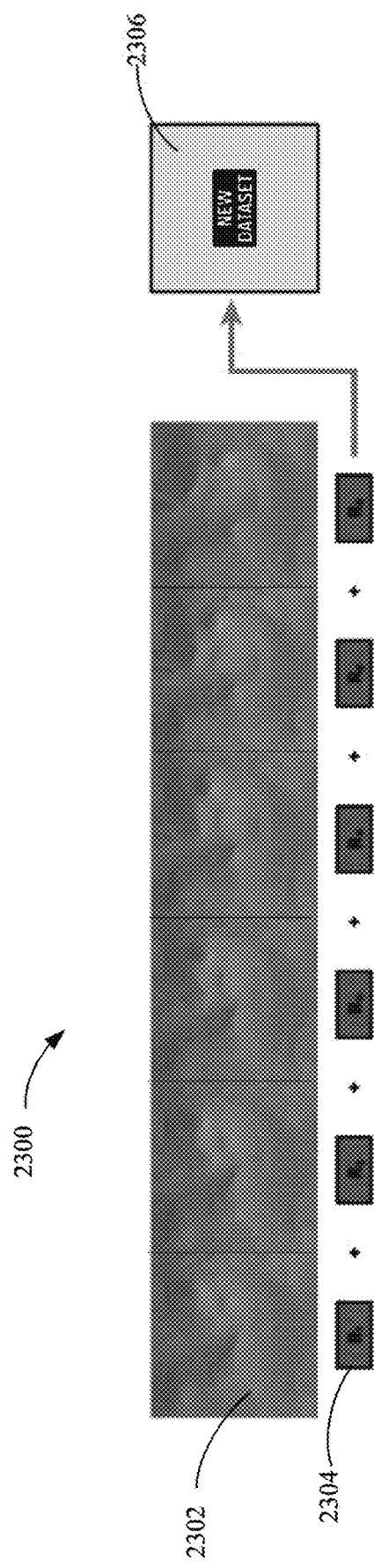
Figure 24:
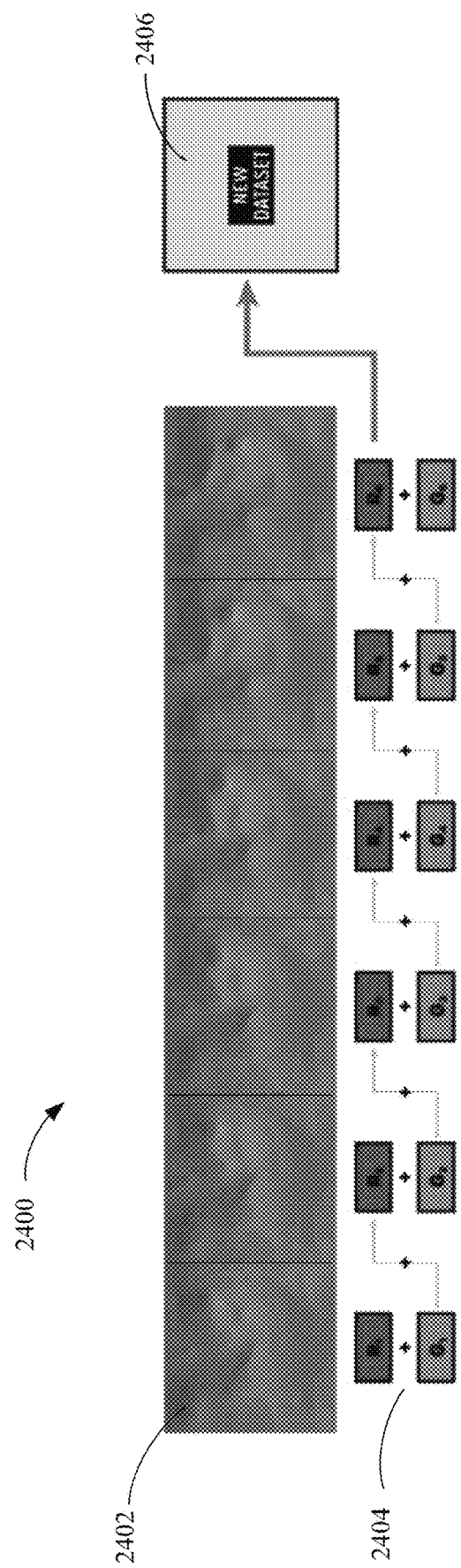

FIGS. 22-24 are diagrams showing example operations of obtaining new datasets from a data image. As shown in FIG. 22, operation 2200 includes performing an operation on returned encoded data from data image 2202 in order to derive one or more new datasets 2206. Operation 2200 may be, for example, an intra-band and/or inter-band operation. Such operations can include taking the sum or difference of two or more channels within a single interval or across multiple intervals. These operations are useful for calculating the accumulation of a particular dataset between two distinct times or across a time series. In the example shown in FIG. 22, data image 2202 includes data stored in channels 2204. As shown, in this example, red and green channels are used. Operation 2200 operates by taking the sum of the red and green channels in order to derive new dataset 2206.

In another example, if a single request contains temperature data at various time intervals, the red channel (R) can represent current temperatures, the green channel (G) can represent temperatures from one hour ago, and a blue channel (B) (not shown) can represent temperatures for 24 hours ago. In this example, 1-hour and 24-hour temperature changes can then be calculated by taking a difference between the red and green channels (R-G) and red and blue channels (R-B) respectively.

In the example shown in FIG. 23-24, inter-band operations are used to perform operations across more intervals in a time series. For example, precipitation amounts for each interval can be added together to create an accumulated precipitation dataset for the entire time series. In the example shown in FIG. 23, operation 2300 includes data image 2302 having data stored in six red channels 2304. In this example, the operation is performed on a dataset in a single channel (e.g., the red channel) and across multiple intervals, as shown. This operation can be used when other datasets are stored in other available color channels per interval and results in more frames being required for the time series. For instance, as shown in FIG. 23, the R channel is shown at six frames, corresponding to six operations/intervals to produce new dataset 2306.

In the example shown in FIG. 24, operation 2400 includes data image 2402 having data stored in six red and six green channels 2304. In this example, the operation is performed on a dataset in multiple channels (e.g., red and green channels) and across multiple intervals, as shown. This operation can be used when no other datasets occupy all other channels, and results in fewer frames being needed for the same time series. For instance, as shown in FIG. 24, the R and G channel is shown at six frames, corresponding to twelve operations/intervals to produce new dataset 2406.

Figure 25:
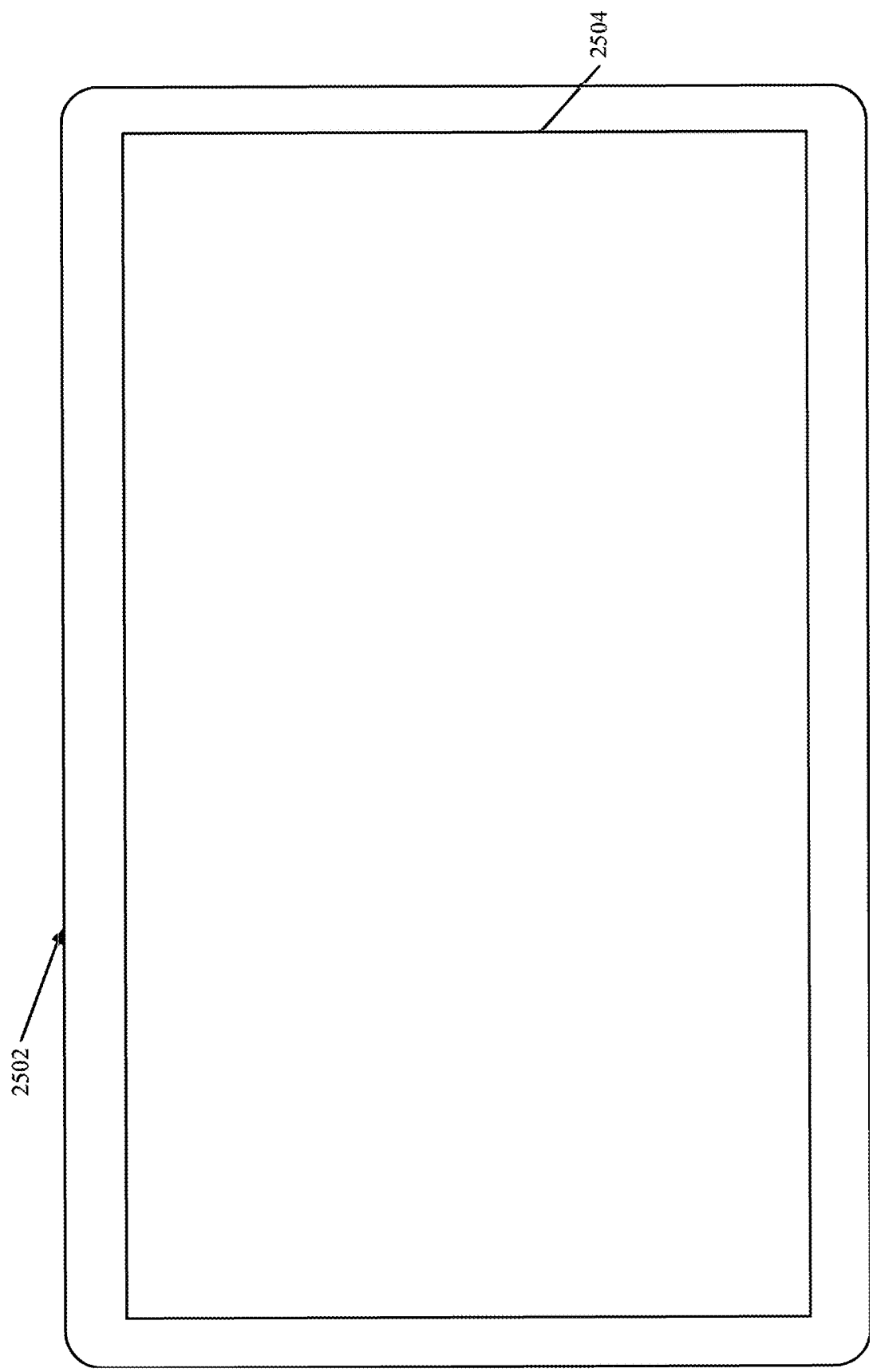
FIG. 25 shows a mobile computing device, in one example.

FIG. 25 shows one embodiment of a mobile computing device that may be configured to facilitate the interaction between a computing system and a user. In one embodiment, a distributed system is implemented on a portable computing device 2502. In FIG. 25, computing device 2502 is shown with user interface display screen 2504. In one embodiment, computing device 2502 and screen 2504 may be a tablet or a mobile phone. Screen 2504 may be a touch screen or a pen-enabled interface that receives inputs from a pen or stylus. It may also use an on-screen virtual keyboard. In another embodiment, computing device 2502 may also be attached to a keyboard or other user input device. Computing device 2502 may also illustratively receive voice inputs as well.

Figure 26:
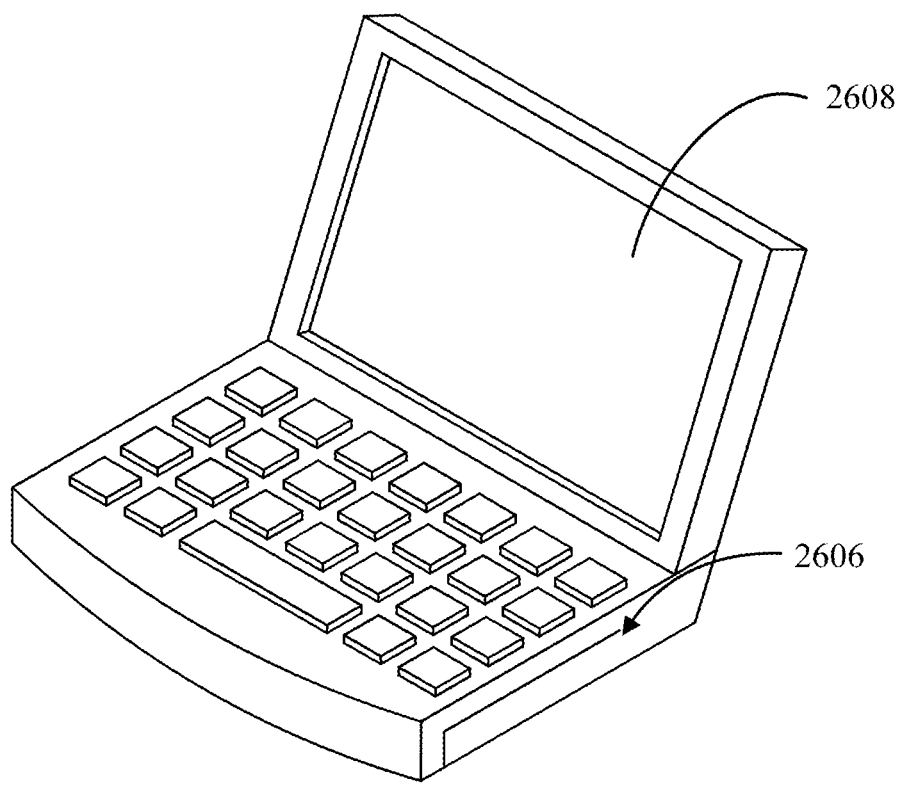
FIG. 26 shows one embodiment of a computing device, in one example.

FIG. 26 shows one embodiment of a computing device that may be configured to facilitate the interaction between a computing system and a user. For example, FIG. 26 provides an additional example of a computing device that may also be used to facilitate the interaction between a user and computing system 460. In FIG. 26 a mobile computer such as a laptop 2606 is provided. Laptop 2606 may include display 2608 that is capable of displaying images including application images, icons, web pages, photographs, and video, and control buttons selecting items shown on the display.

A variety of user interfaces have been discussed. These user interfaces may include a wide variety of display configurations that have user input mechanisms. As mentioned above with respect to FIG. 26, for example, user input mechanisms may include search boxes, text boxes, check boxes, drop-down menus, icons, links, etc. The user input mechanisms may be actuated in a variety of ways. For example, where the user interface is displayed on a touch-sensitive display device, the inputs may be actuated by touch gestures or motions relative to the screen. Similarly, where the device supports voice recognition and processing, the inputs may be actuated by various voice commands. Where the display device comprises a laptop computer, user input mechanisms may include mechanical buttons. Mechanical buttons may include, for example, switches, joysticks, keyboard, thumb switches, etc. In addition, the display device may be configured to include a combination of mechanical (or hardware) and touch or voice input mechanisms. For example, the laptop as shown in FIG. 26 may include keyboard, mouse, and touch-sensitive display screen input mechanisms.

Various processors and servers have also been discussed. Processors and severs described herein may be functional parts of the system that facilitate the functionality of various components of the system. As similarly discussed above with respect to processor 102/402 (shown in FIGS. 2 and 4), for example, the processor may be a functional part of the computing system and is activated by and facilitates the functionality of other components in the system. Servers may include any server that is configured to facilitate database services for the data stores of the system. The processors and servers may have separate circuitry and timing components that are not shown in the figures.

It will be noted that the above discussion has described a variety of different systems, components, modules, elements, and/or types of items. It should be understood that these can be implemented in any of a variety of ways. For example, they can be implemented as logic. It will be appreciated that such systems, components, and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described herein. These are only some examples of different structures that can be used to form the systems, components and/or logic described above. Other structures can be used as well.

Figure 27:
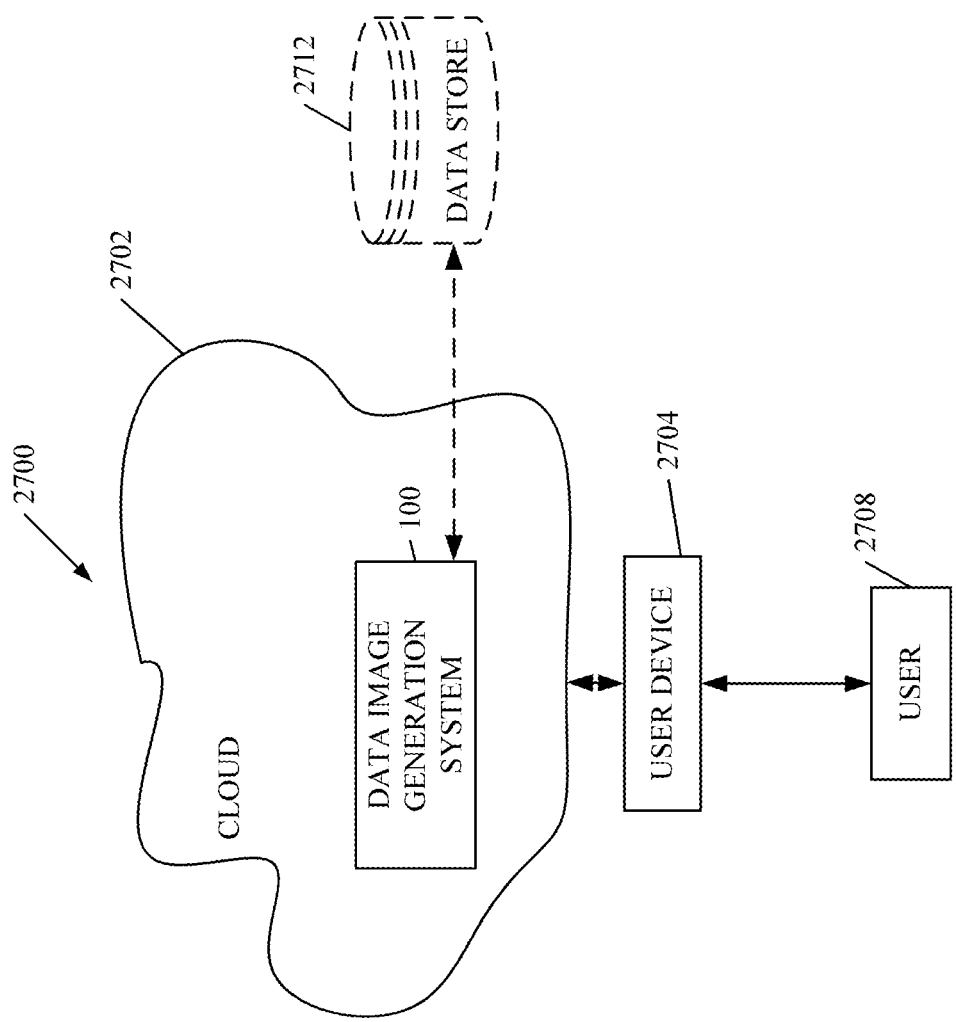
FIG. 27 illustrates a block diagram of a computing environment, in one example.

FIG. 27 illustrates a block diagram of one embodiment of a computing environment. In one embodiment, FIG. 27 is a block diagram of a cloud computing architecture 2700. In general, cloud computing allows for data distribution over a network connection, such network 2702, without requiring a knowledge of the physical location or a configuration of system 2714. Cloud computing may allow a service provider to provide access to a software application over the network and through a web portal such as a web browser application. In the embodiment shown in FIG. 27, cloud 2702 provides user devices 2704 and thus users access to system 100. For instance, user may access system 100 and its associated components and their functions through an internet browser. The system may supply database system 2716 and the corresponding data as a single point of access for user 2708. FIG. 27 also shows that data store 2712 and local data system 2710 may be included in cloud architecture 2700. The various components that interact with system 2714 may be included in cloud 2702 or separate from the cloud server. Where the components are not included in the cloud server 2702, they may be configured to communicate with those that are. As such, cloud architecture 2700 allows a user to access all the functionality of system 2714 and its data services through a single, intuitive point of access.

The cloud architecture discussed herein may include one or more configurations of either public or private cloud computing, or a combination of both public and private cloud computing. The level of security applied to the cloud computing environment may be uniquely configured by the vendor of the cloud services. In addition, the broker or vendor of local data systems may be able to configure the level of cloud environment security.

Figure 28:
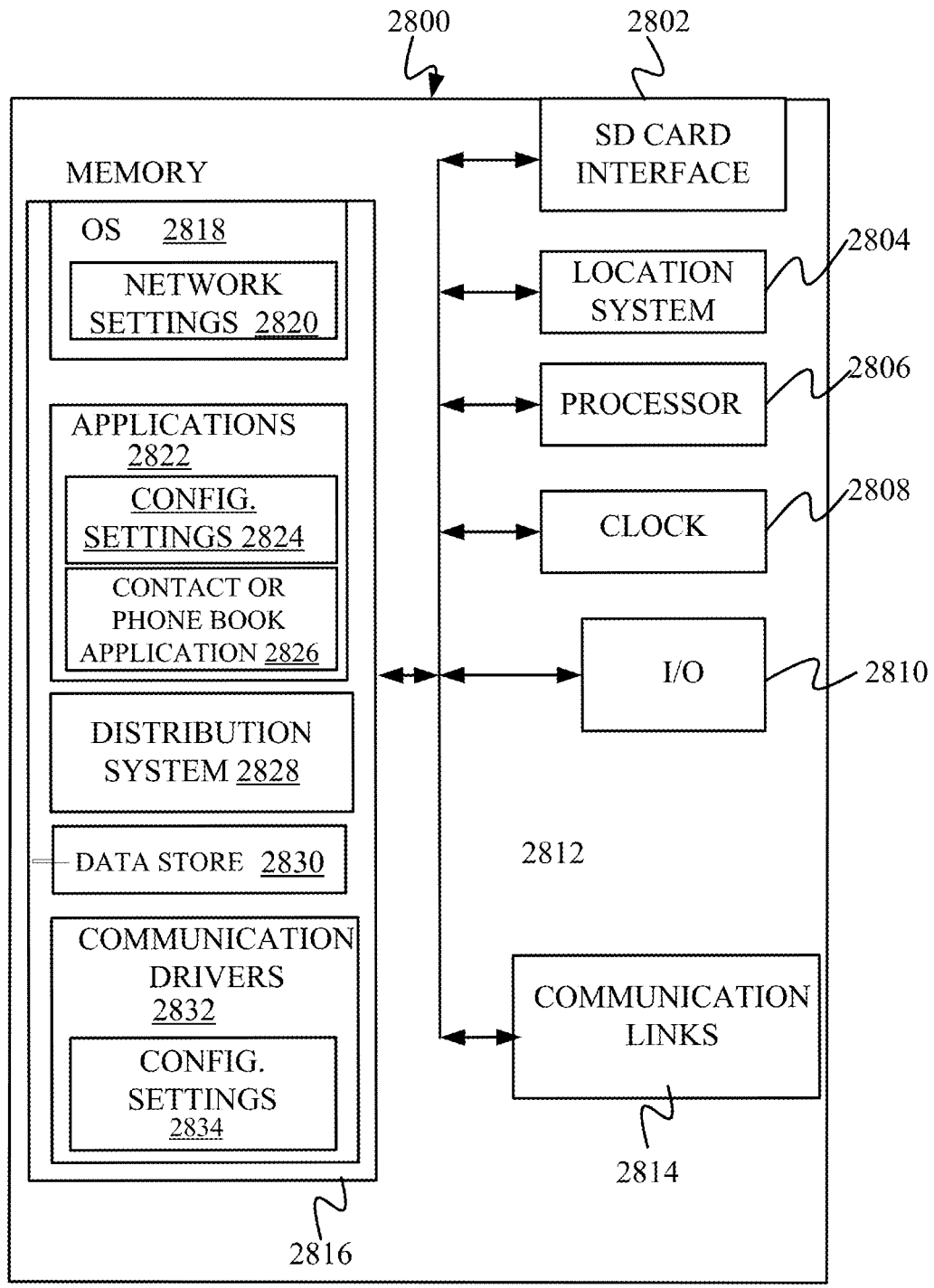
FIG. 28 illustrates a simplified block diagram of a computing device, in one example.

FIG. 28 illustrates a simplified block diagram of one embodiment of a computing device. For example, FIG. 28 illustrates a general block diagram of various components of computing device 2800 that may run the components of computing architecture 2700. Communication link 2814 is provided in device 2800 to allow device 2800 to communicate with the various components of system 101 and other devices. Link 2814 may include a variety of channels for receiving information and connecting device 2800 to a network. As such, device 2800 may be configured to communicate to other devices and applications operating in or through cloud 2702.

In one embodiment, the various component of device 2800 are interconnected by a communication bus, generally indicated by 2812. Applications and information may be received on a removable or permanent Secure Digital (SD) card that is connected to SD card interface 2802. Thus, both communication links 2814 and SD card interface 2802 communicate with processor 2806. These components may communicate via communication bus 2812, and are also connected to location system 2804, clock 2808 and input/output component (I/O) 2810.

Clock 2808 may include a real time clock that outputs a time and date, and may provide timing functionality to processor 2806. Location system 2804 may include a component that determines and/or outputs a geographical location of device 2800. Location system 2804 may include a variety of location system configurations. For example, these configurations may include a global positioning system (GPS) receiver, a long range navigation system such as LORAN, a dead reckoning system, a cellular triangulation system, or other positioning system. Location system 2804 may also provide functionality for generating map images or geographical depictions based on the determined location.

I/O components 2810 may include components such as hardware and software input buttons, touch sensors, optical sensors, microphones, touch sensitive display screens, proximity sensors, light sensors, accelerometers, orientation sensors, compass sensors. Output components may include display devices, user interface components, a speaker, a vibration mechanism, and/or a printer port, for example. A variety of other I/O components may also be used.

Memory 2816 illustratively shows storage of operating system (OS) 2818, network settings 2820, applications 2822, configuration settings 2824, contact or phone book application 2826, distribution system 2828, data store 2830, communication drivers 2832, and communication configuration settings 2834. Memory 2816 may include volatile and non-volatile memory storage, computer storage media, and any other type of memory storage.

Applications 2822 may include applications that have been previously stored on device 2800 or applications that are installed during use of distribution system 2828, for example. Applications 2822 may also include cloud-based applications that are provided by a software as a service (SaaS).

Figure 29:
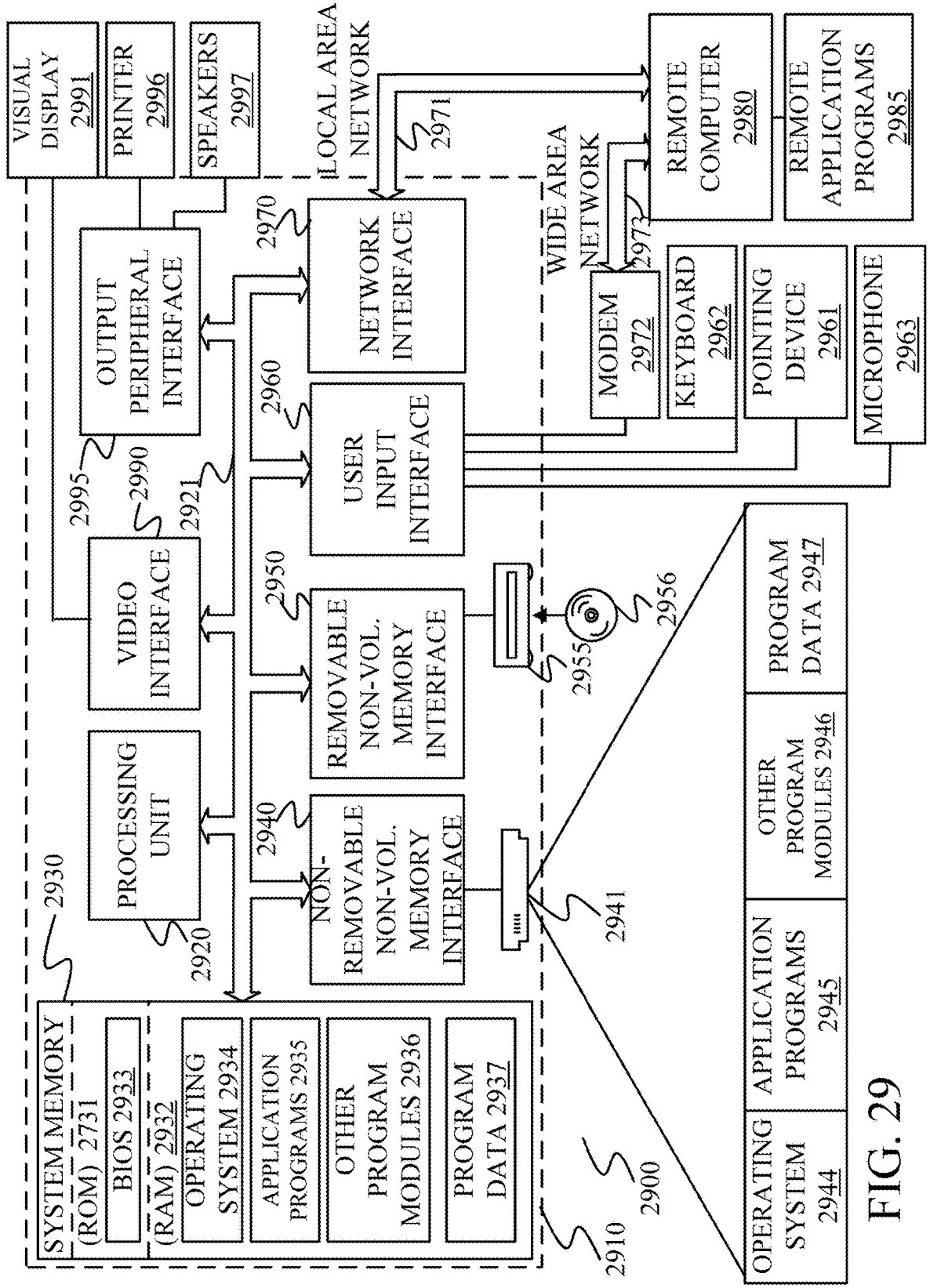
FIG. 29 illustrates a block diagram of an encompassing computing environment, in one example.
Figure 30:
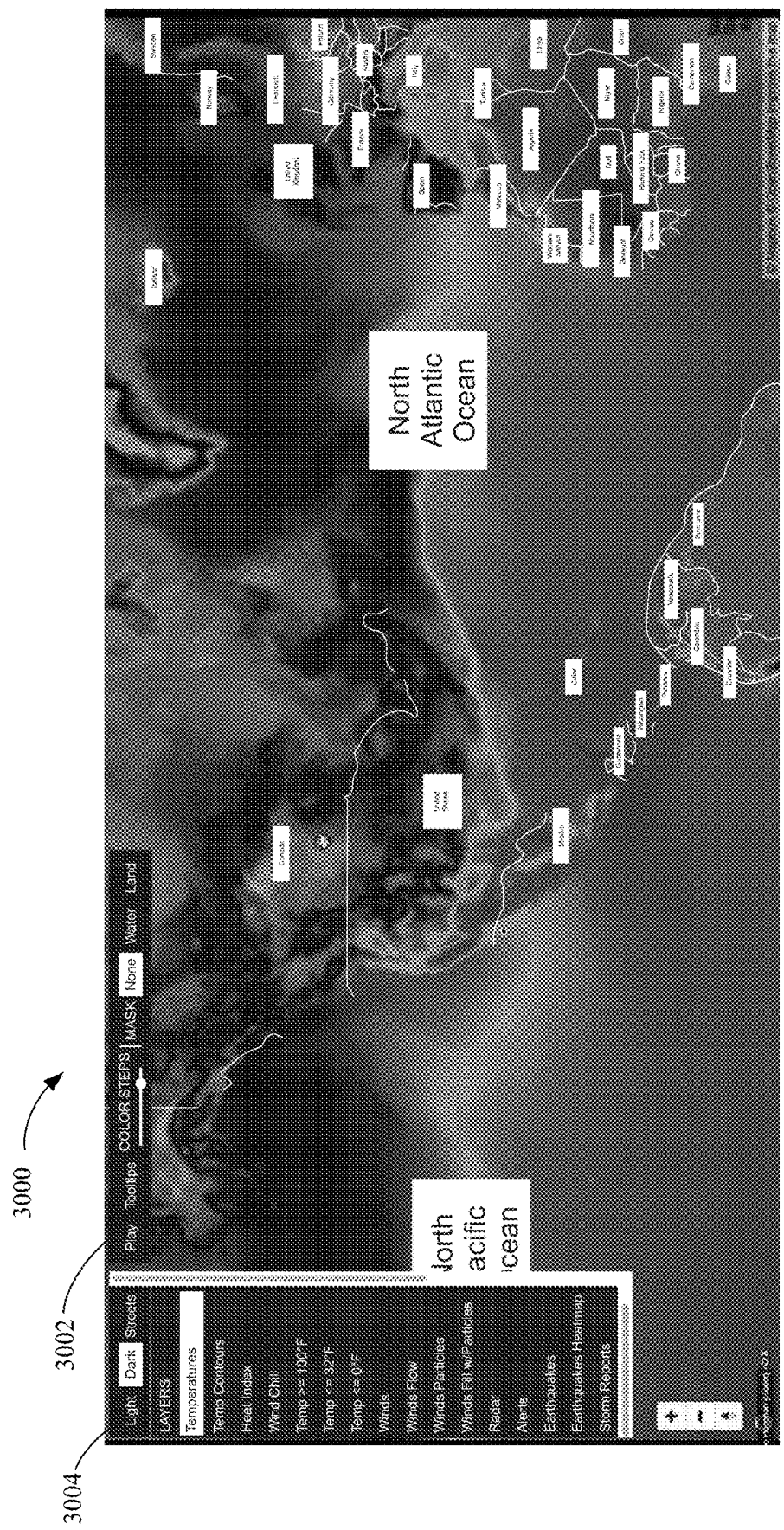
FIGS. 30-36 are diagrams showing example interfaces.
Figure 31:
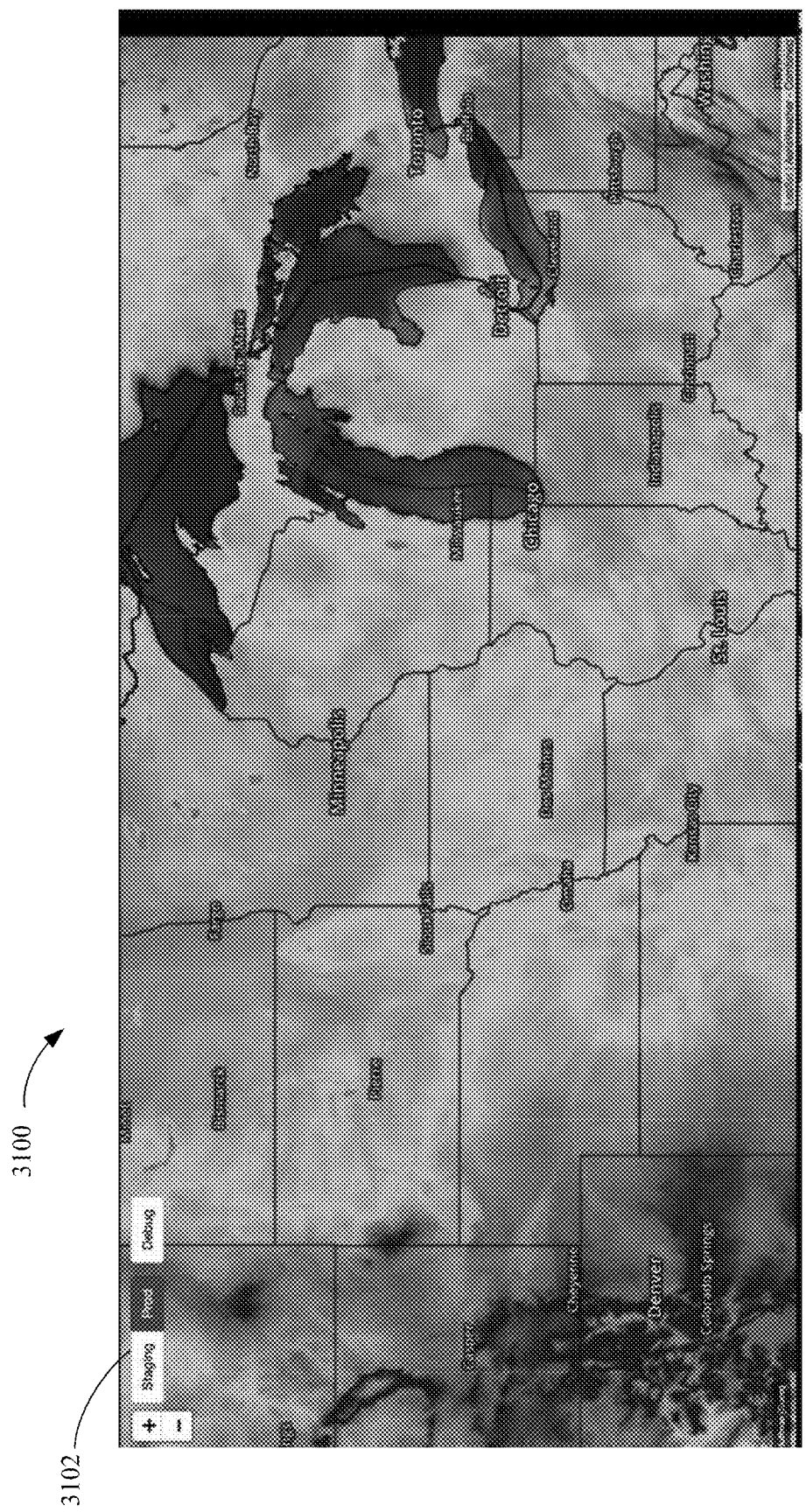
Figure 32:
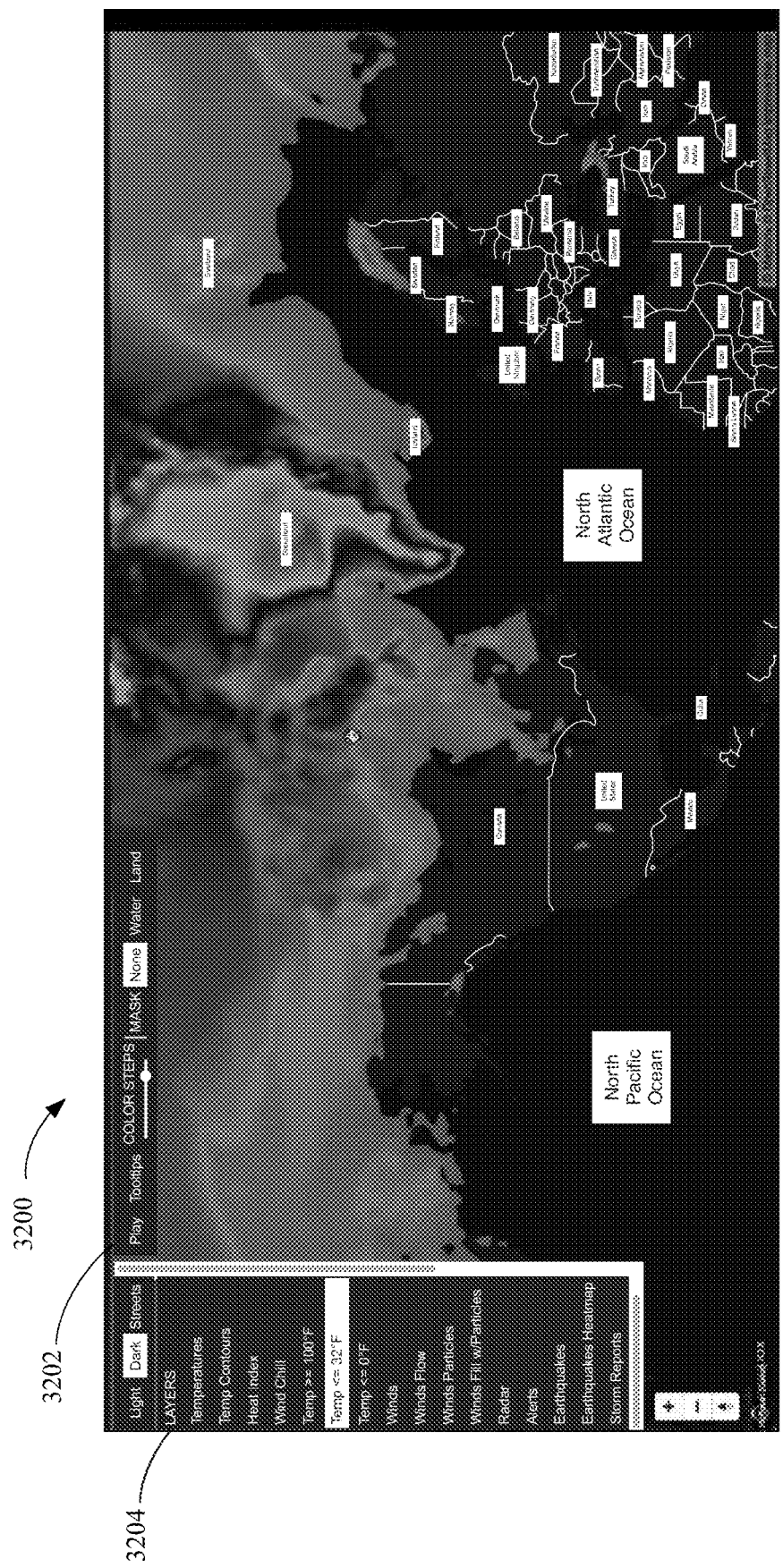
Figure 33:
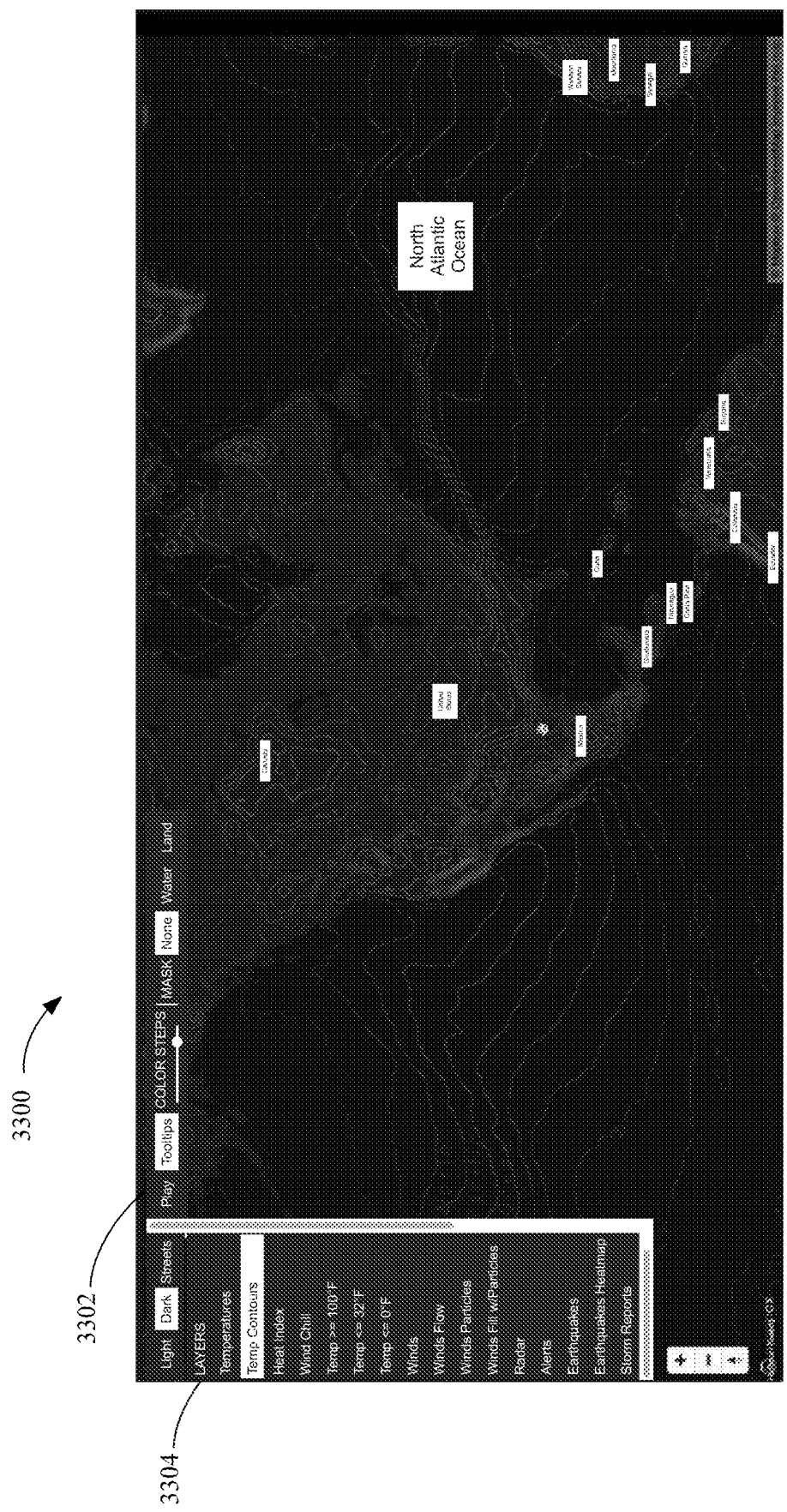

FIG. 29 illustrates a block diagram of one embodiment of an encompassing computing environment. FIG. 29 illustratively comprises a general-purpose computing device configured as a computer 2910. Computer 2910 may include a variety of components that are configured to facilitate the functionality of a distribution system, for example. Computer 2910 may include a processing unit 2920, a system memory 2930 and a communication bus 2921 that may facilitate communication between the various components. The system bus 2921 may be any of several types of bus structures including a memory bus or memory controller, a peripheral bus, and a local bus using any of a variety of bus architectures. The various applications and implementations of data image generation system 100, as described herein, may be deployed in corresponding elements of FIG. 26.

Computer 2910 may comprise a variety of computer readable media. Computer readable media may be any available media that may be accessed by computer 2910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computer 2910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2930 includes computer storage media in the form of volatile and/or nonvolatile memory such as read only memory (ROM) 2931 and random access memory (RAM) 2932. A basic input/output system 2933 (BIOS), containing the basic routines that help to transfer information between elements within computer 2910, such as during start-up, is typically stored in ROM 2931. RAM 2932 typically contains data and/or program modules that are immediately accessible to and/or presently being operated on by processing unit 2920. By way of example, and not limitation, FIG. 29 illustrates operating system 2934, application programs 2935, other program modules 2936, and program data 2937.

The computer 2910 may also include other removable/non-removable volatile/nonvolatile computer storage media. By way of example only, FIG. 29 illustrates a hard disk drive 2941 that reads from or writes to non-removable, nonvolatile magnetic media, a magnetic disk drive 2951, nonvolatile magnetic disk 2952, an optical disk drive 2955, and non-volatile optical disk 2956. The hard disk drive 2941 is typically connected to the system bus 2921 through a non-removable memory interface such as interface 2940, and magnetic disk drive 2951 and optical disk drive 2955 are typically connected to the system bus 2921 by a removable memory interface, such as interface 2950.

Alternatively, or in addition, the functionality described herein may be performed, at least in part, by one or more hardware logic components. For example, and without limitation, illustrative types of hardware logic components that may be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 26, provide storage of computer readable instructions, data structures, program modules and other data for the computer 2910. In FIG. 29, for example, hard disk drive 2941 is illustrated as storing operating system 2944, application programs 2945, other program modules 2946, and program data 2947. Note that these components may either be the same as or different from operating system 2934, application programs 2935, other program modules 2936, and program data 2937.

A user may enter commands and information into the computer 2910 through input devices such as a keyboard 2962, a microphone 2963, and a pointing device 2961, such as a mouse, trackball or touch pad. Other input devices (not shown) may include a joystick, game pad, satellite dish, scanner, or the like. These and other input devices are often connected to the processing unit 2920 through a user input interface 2960 that is coupled to the system bus, but may be connected by other interface and bus structures. A visual display 2991 or other type of display device is also connected to the system bus 2921 via an interface, such as a video interface 2990. In addition to the monitor, computers may also include other peripheral output devices such as speakers 2997 and printer 2996, which may be connected through an output peripheral interface 2995.

The computer 2910 is operated in a networked environment using logical connections (such as a local area network—LAN, or wide area network WAN) to one or more remote computers, such as a remote computer 2980.

When used in a LAN networking environment, the computer 2910 is connected to the LAN 2971 through a network interface or adapter 2970. When used in a WAN networking environment, the computer 2910 typically includes a modem 2972 or other means for establishing communications over the WAN 2973, such as the Internet. In a networked environment, program modules may be stored in a remote memory storage device. FIG. 29 illustrates, for example, that remote application programs 2985 may reside on remote computer 2980.

FIGS. 30-36 are diagrams showing example interfaces. The data displayed by these interfaces can be retrieved in ways mentioned above. For example, the data may be derived from multi-channel data images. As shown in FIGS. 30-36, interfaces 3000-3600 have different settings applied that alter the display. For example, interface 3000 has a color scheme different than interfaces 3100-3600. The color scheme can be adjusted to interpose weight values between defined color stops, which results in a smoother gradient across values for the same data. Additionally, the color scheme can also be adjusted to include other hues. Interfaces 3000-3600 illustratively include interface settings 3002-3602 and a list of layers 3004-3604.

Figure 34:
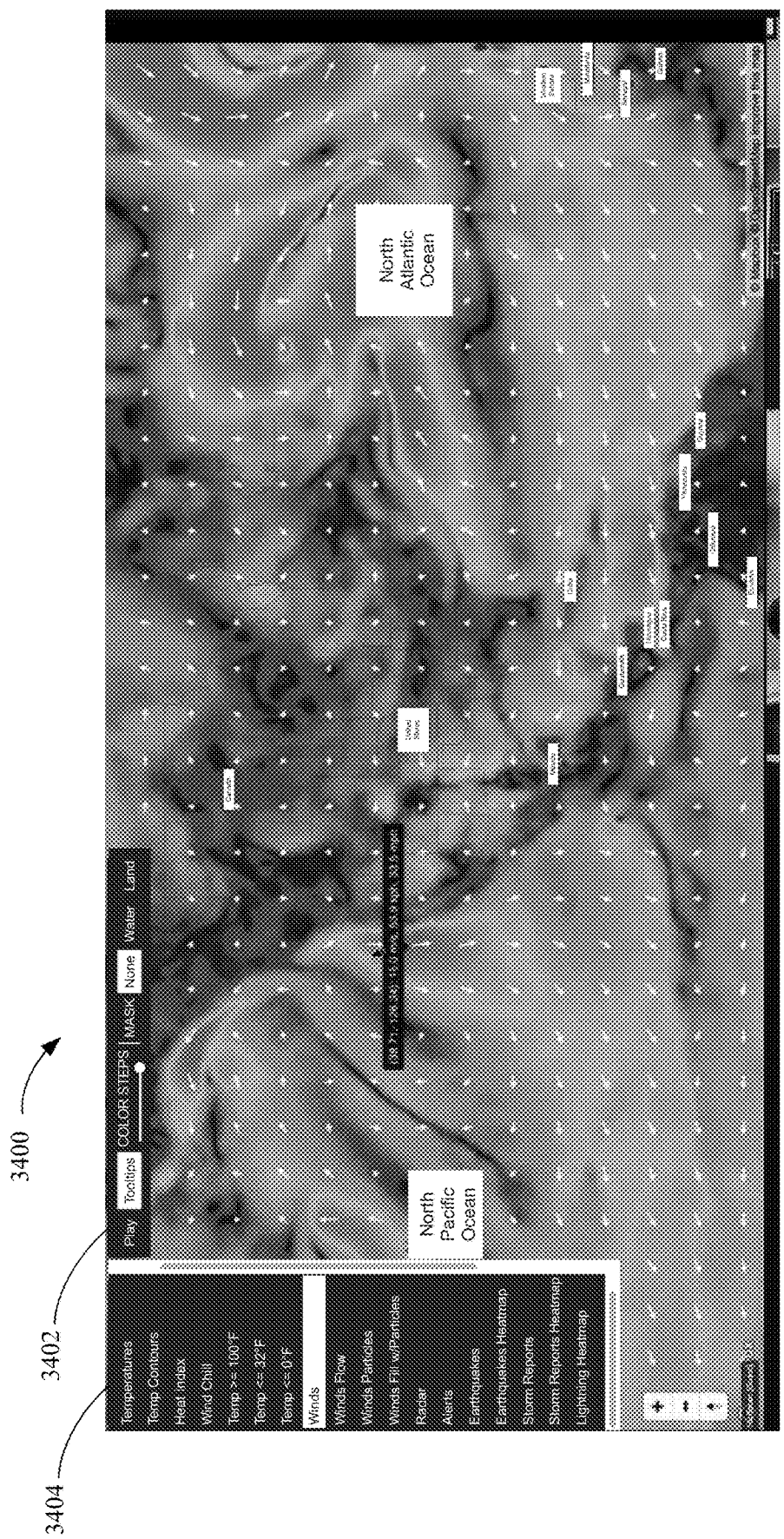
Figure 35:
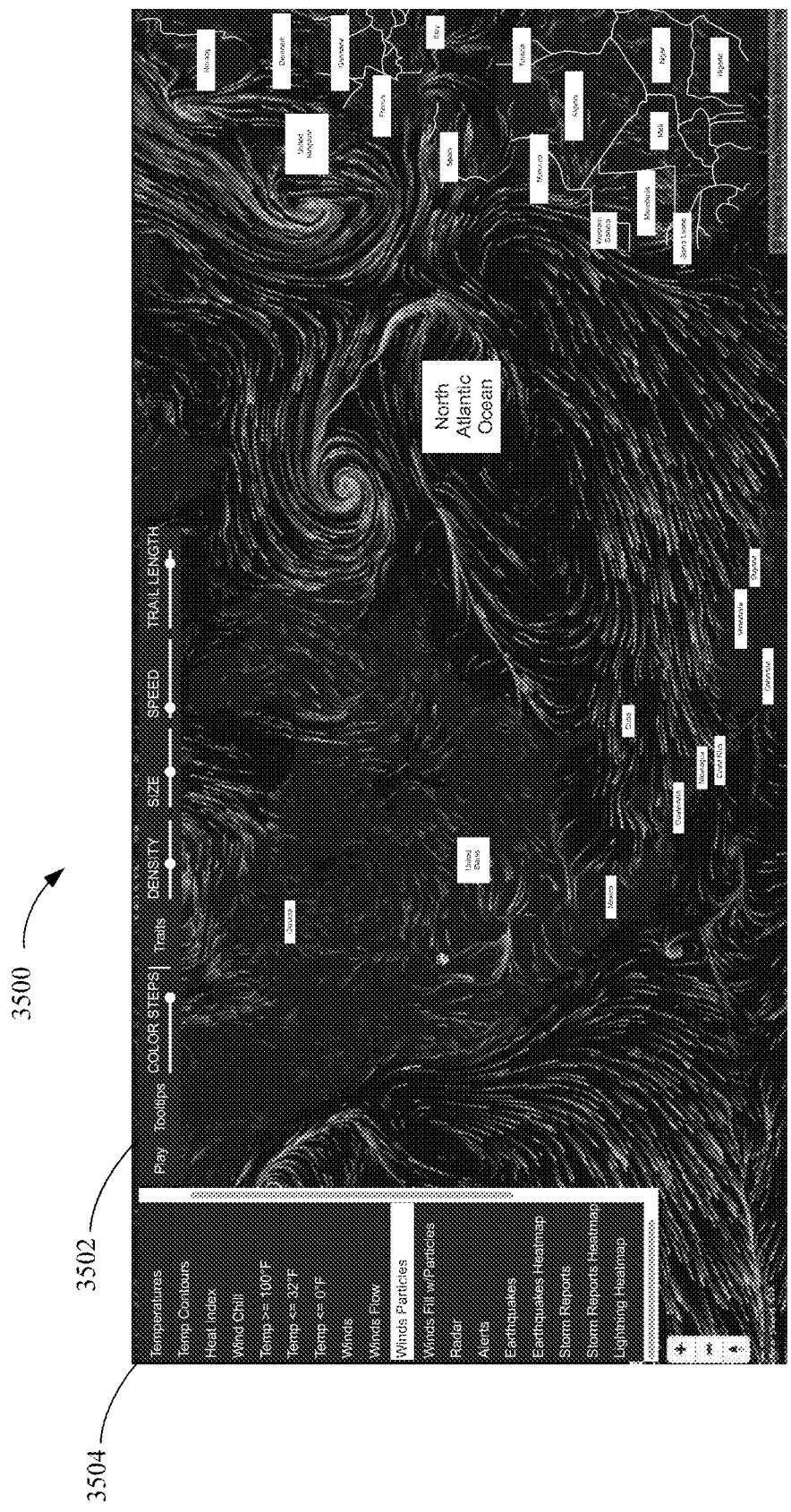
Figure 36:

As shown in FIGS. 30-36, selecting a different layer in list 3004-3604 causes the interface to display information and the corresponding color scheme relevant to the selected layer. For example, as shown in FIG. 34, selecting the wind template causes wind patterns and the associated information to display on interface 3400 in a similar manner to that discussed above with respect to FIG. 18. In another example, as shown in FIG. 35, selecting the wind particles template causes wind particles and the associated information to display on interface 3500 in a similar manner to that discussed above with respect to FIG. 19.

Although the present invention has been described with reference to preferred embodiments, workers skilled in the art will recognize that changes may be made in form and detail without departing from the spirit and scope of the invention. For instance, the present disclosure describes data generation and transmission in the context of environmental/weather data across geographic regions. However, the systems and methods described herein could be used for other applications as well. For example, the monitoring of building climate. For example, the monitoring of the location of people and objects in an area.

What is claimed is:

1. A method of transmitting environmental data, the method comprising:
   receiving a request for requested data corresponding to a first environmental characteristic and a second environmental characteristic wherein the first environmental characteristic and second environmental characteristic are part of the environmental data;
   retrieving a first set of data corresponding to the first environmental characteristic;
   retrieving a second set of data corresponding to the second environmental characteristic;
   generating an image, specifically formatted for transmission, having a first channel and a second channel, wherein generating the image comprises generating a plurality of sub-images that are duplicative relative to position, and wherein at least some sub-images correspond to the same time but a different environmental characteristic value and at least some sub-images correspond to the same environmental characteristic but a different time value; and
   transmitting the image comprising the plurality of sub-images;
   wherein the values of the first channel correspond to the first set of data and wherein the values of the second channel correspond to the second set of data.

2. The method of claim 1, wherein the values of the first channel and second channel of a first sub-image correspond to the first set of data and the second set of data, respectively and wherein the values of the first channel and second channel of the second sub image correspond to a third set of data and a fourth set of data, respectively.

3. The method of claim 2, wherein the third set of data and fourth set of data correspond to a different time than the first set of data and the second set of data.

4. The method of claim 2, wherein the third set of data and the fourth set of data correspond to different environmental characteristics than the first set of data and the second set of data.

5. The method of claim 2, wherein generating the image comprises generating a third sub-image and a fourth sub-image.

6. The method of claim 5, wherein the values of the first channel and second channel of the third sub-image correspond to a fifth set of data and a sixth set of data, respectively and wherein the values of the first channel and second channel of the fourth sub-image correspond to a seventh set of data and an eighth set of data, respectively.

7. The method of claim 6, wherein the first sub-image, the second sub-image, the third sub-image, and the fourth sub-image correspond to frames of an animation.

8. A computing system for transmitting environmental data, the system comprising:
   one or more processors; and
   memory storing instructions executable by the one or more processors, wherein the instructions, when executed by the one or more processors, configure the computing system to provide:
   a data request validation component configured to receive a request for requested data corresponding to a first environmental characteristic and a second environmental characteristic;
   a data retrieval component configured to retrieve a first set of data corresponding to the first environmental characteristic and a second set of data corresponding to the second environmental characteristic;
   an image generation component configured to generate an image having a first channel and a second channel, wherein generating the image comprises generating a plurality of sub-images that are duplicative relative to position, and wherein at least some sub-images correspond to the same time but a different environmental characteristic value and at least some sub-images correspond to the same environmental characteristic but a different time value;
   wherein the values of the first channel correspond to the first set of data and wherein the values of the second channel correspond to the second set of data.

9. The computing system of claim 8, wherein the image is in one of the following formats: PNG, TIFF, JPG.

10. The computing system of claim 8, wherein the instructions configure the computing system to provide:
    a user interface generation component configured to generate a representation of the environmental data, wherein the representation comprises data points plotted from the environmental data and further comprises values plotted between the data points using interpolation.

* * * * *